United States Patent
Volman et al.

(10) Patent No.: US 8,730,095 B1
(45) Date of Patent: May 20, 2014

(54) SUPER-ANGULAR AND RANGE-RESOLUTION WITH PHASED ARRAY ANTENNA AND MULTIFREQUENCY DITHER

(71) Applicant: Lockheed Martin Corporation, Bethesda, MD (US)

(72) Inventors: Vladimir Volman, Newtown, PA (US); John B. Stetson, New Hope, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/919,634

(22) Filed: Jun. 17, 2013

Related U.S. Application Data

(62) Division of application No. 12/879,509, filed on Sep. 10, 2010, now Pat. No. 8,466,829.

(60) Provisional application No. 61/242,125, filed on Sep. 14, 2009.

(51) Int. Cl.
*G01S 13/00* (2006.01)

(52) U.S. Cl.
USPC ................ 342/153; 342/147; 342/73; 342/82

(58) Field of Classification Search
USPC ................ 342/73, 74, 82, 147, 157
See application file for complete search history.

(56) References Cited

U.S. PATENT DOCUMENTS

| | | | |
|---|---|---|---|
| 2,426,460 A | 8/1947 | Lewis | |
| 3,012,244 A | 12/1961 | Langenwalter et al. | |
| 4,749,995 A * | 6/1988 | Hopwood et al. | 342/371 |
| 5,541,607 A | 7/1996 | Reinhardt | |
| 5,734,345 A * | 3/1998 | Chen et al. | 342/74 |
| 5,940,029 A * | 8/1999 | Ninomiya et al. | 342/372 |
| 5,943,010 A * | 8/1999 | Rudish et al. | 342/372 |
| 6,531,976 B1 | 3/2003 | Yu | |
| 6,624,783 B1 | 9/2003 | Rabideau | |
| 6,778,137 B2 | 8/2004 | Krikorian et al. | |
| 6,778,138 B2 | 8/2004 | Purdy et al. | |
| 2006/0125687 A1 | 6/2006 | Greeley | |
| 2009/0015474 A1* | 1/2009 | Wicks et al. | 342/372 |
| 2009/0303108 A1* | 12/2009 | Hilsebecher et al. | 342/157 |
| 2009/0315761 A1* | 12/2009 | Walter et al. | 342/200 |
| 2012/0115429 A1* | 5/2012 | Falk | 455/296 |

OTHER PUBLICATIONS

Sherman, S. M., "Monopulse Principles and Techniques", Artech House, Norwood, MA 1984, Chapter 7, pp. 151-200.

(Continued)

*Primary Examiner* — John B Sotomayor
*Assistant Examiner* — Marcus Windrich
(74) *Attorney, Agent, or Firm* — Howard IP Law Group, PC

(57) ABSTRACT

An electromagnetic transmitter arrangement includes an antenna line array or subarray defining at least first and second ends, and including first, second, third, fourth, and fifth antenna elements, arranged with the first antenna element at the first end, the fifth element at the second end, the third element at the center, the second element between the first and third elements, and the fourth element between the third and fifth elements. Multiple (N) corresponding radio frequency sources are provided, each source communicating with a respective antenna element along a given radio-frequency signal path extending from the given signal source to the given antenna element, and where a first signal source generates signals at frequency f0, and each of the N−1 additional sources generate signals at frequencies of f0±(N−1)Δf, where N is an integer greater than or equal to 5.

20 Claims, 17 Drawing Sheets

(56) References Cited

OTHER PUBLICATIONS

Skolnik, M. I., "Introduction to Radar Systems," 3d Edition, New York, pp. 213-238, 252-255.
Tucker, D. G., et al., "Electronic Sector Scanning," Journal of the British Institution of Radio Engineers, vol. 18, Aug. 1958, pp. 465-484.
Griffiths, J.W.R., et al., "A Digital Sonar System," Journal of Science Instruments, vol. 43, 1966, pp. 534-535.
Johnson, M. A., "Phased-Array Beam Steering by Multiplex Sampling," Proceeding of the IEEE, vol. 56, Nov. 1968, pp. 1801-1811.
Radford, M. F., et al., "A Within-Pulse Scanning Height-Finder," IEE Conference on Radar, Present and Future, 1973, pp. 50-55.
Zhang, Guifu, et al., "Angular and range interferometry to refine weather radar resolution", Radio Science, vol. 40, RS3013, doi: 1029/2004RS003125, 2005, pp. 1-10.
Edgar, A. K., et al., "Flood-Lighting With Nyquist Rate Scanning," AGARD Conference on Advanced Radar Systems, Istanbul, 1970, pp. 15-1-15-10.
Shanks, H. E., "A New Technique for Electronic Scanning," IRE Transactions, AP-9, Mar. 1961, pp. 162-166.
Cottony, H.V., et al., "A High-Resolution Rapid-Scan Antenna," Journal of Research of the National Bureau of Standards-D. Radio Propagation, vol. 65D, No. 1, Jan.-Feb. 1961, pp. 101-110.
Davies, D.E.N., "High Data Rate Radars Incorporating Array Signal Processing and Thinned Arrays", IEEE International Radar Conference, 1975, pp. 371-375.
Davies, D.E.N., "A Fast Electronically Scanned Radar Receiving System". Journal of the British Institution of Radio Engineers, vol. 21, 1961, pp. 305-318.
Davies, D.E.N., "Beam-positioning Radar Systems Utilizing Continuous Scanning Techniques," Proceedings of the IEE, vol. 112, No. 3, 1965, pp. 493-496.
Lai, K. (Hsin-Jung), et al., "Super Fast Scanning Technique for Weather Radar Application", AP2000 Millennuium conference on Antenna and Propagation, Apr. 2000.
Hansen, R. C., "Phased Array Antennas", John Wiley & Sons, New York 1998, pp. 7-15.
Berkowitz, R. S., "Modern Radar", John Wiley & Sons, New York 1965, pp. 141-165.

\* cited by examiner

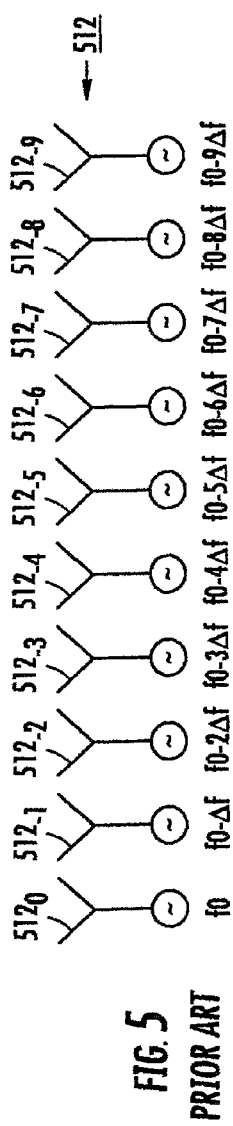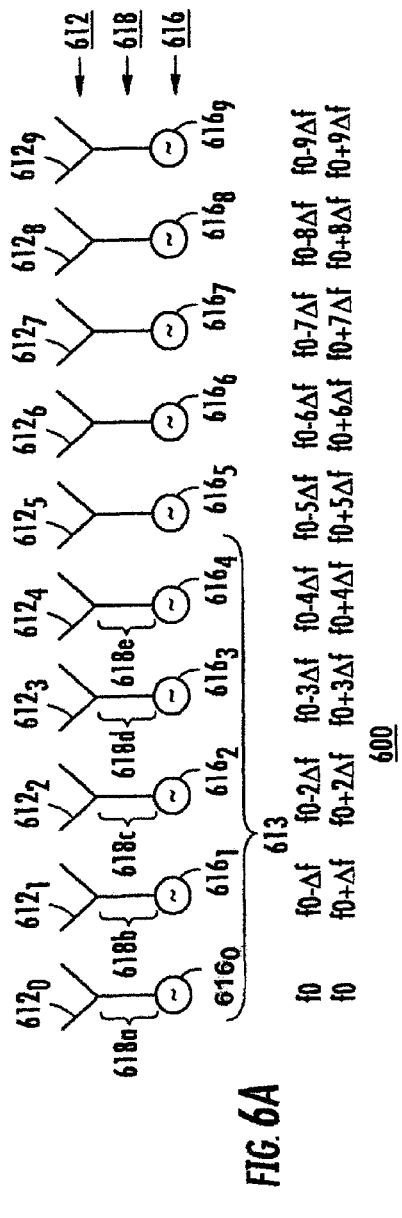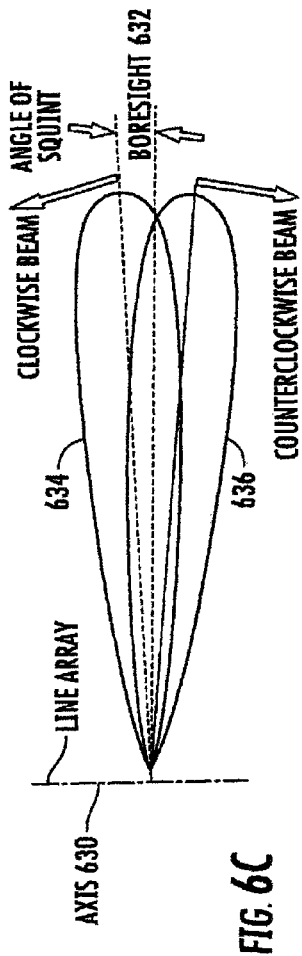

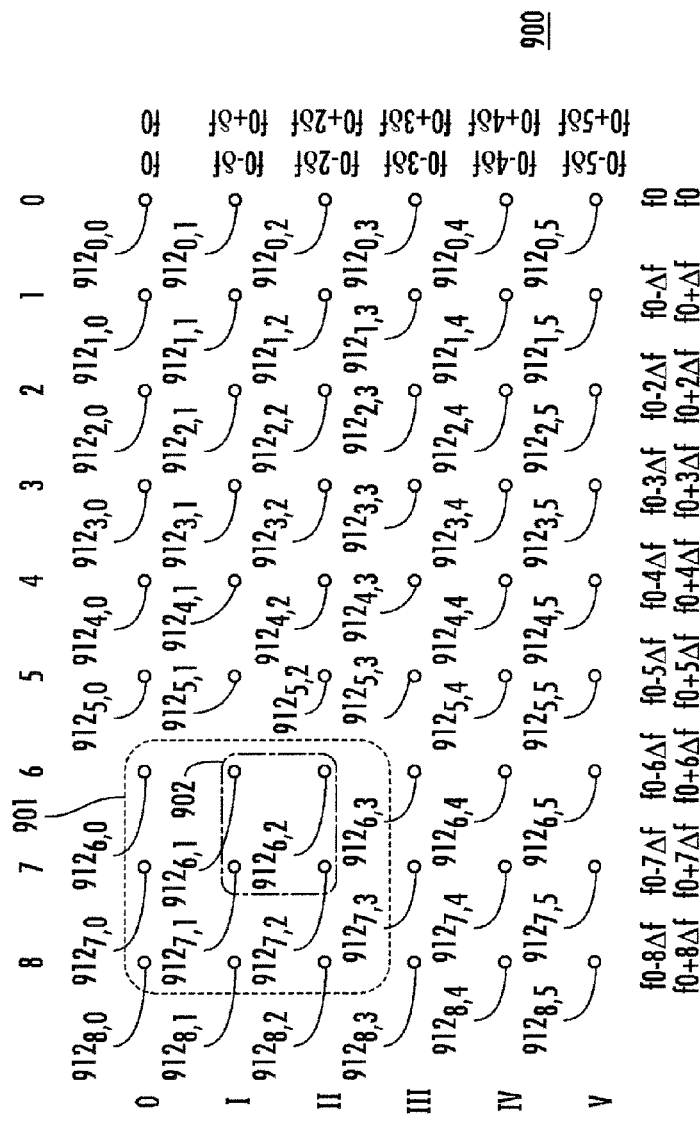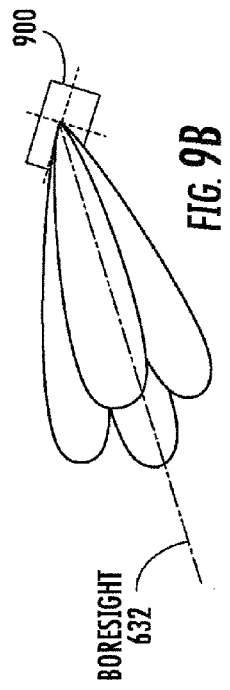
FIG. 9A
FIG. 9B

TABLE 1

| SNR IN dB | NUMBER OF TARGET POSITIONS RESOLVED BY DITHER RADAR | PROBABILITY OF CORRECT ESTIMATION IN % (SIGMA) | NUMBER OF TARGET POSITIONS RESOLVED BY MONOPULSE RADAR | DITHER IMPROVEMENT RATIO |
|---|---|---|---|---|
| -10 | 5 | 85(1.44) | 2.75 | 1.82 |
| 0 | 9 | 97(2.2) | 5.69 | 1.58 |
| 3 | 17 | 98(2.35) | 7.52 | 2.26 |
| 6 | 33 | 98(2.35) | 10.63 | 3.01 |
| 9 | 65 | 97.5(2.25) | 15.68 | 4.14 |
| 12 | 129 | 96(2.05) | 24.3 | 5.03 |
| 19 | 257 | 97.2(2.20) | 50.7 | 5.06 |

FIG. 13

SUPER-ANGULAR AND RANGE-RESOLUTION WITH PHASED ARRAY ANTENNA AND MULTIFREQUENCY DITHER

CROSS-REFERENCE TO RELATED APPLICATIONS

This application is a divisional patent application of U.S. patent application Ser. No. 12/879,509, filed Sep. 10, 2010, which claims the benefit of the priority date of Provisional Application No. 61/242,125 filed Sep. 14, 2009 in the name of Volman et al., the subject matter thereof incorporated herein by reference.

BACKGROUND

Those skilled in the arts of antenna arrays and beamformers know that antennas are transducers which transduce electromagnetic energy between unguided- and guided-wave forms. More particularly, the unguided form of electromagnetic energy is that propagating in "free space," while guided electromagnetic energy follows a defined path established by a "transmission line" of some sort. Transmission lines include coaxial cables, rectangular and circular conductive waveguides, dielectric paths, and the like. Antennas are totally reciprocal devices, which have the same beam characteristics in both transmission and reception modes. For historic reasons, the guided-wave port of an antenna is termed a "feed" port, regardless of whether the antenna operates in transmission or reception. The beam characteristics of an antenna are established, in part, by the size of the radiating portions of the antenna relative to the wavelength. Small antennas make for broad or nondirective beams, and large antennas make for small, narrow or directive beams. When more directivity (narrower beamwidth) is desired than can be achieved from a single antenna, several antenna elements may be grouped together into an "array" and fed together in a phase-controlled manner, to generate the beam characteristics of an antenna larger than that of any single antenna element, and which is therefore capable of generating a narrower beam than a single antenna element of the array. The structures which control the apportionment of power to (or from) the antenna elements are termed "beamformers." A beamformer includes a beam port and a plurality of element ports. In a transmit mode, the signal to be transmitted is applied to the beam port and is distributed by the beamformer to the various element ports. In the receive mode, the unguided electromagnetic signals received by the antenna elements and coupled in guided form to the element ports are combined to produce a beam signal at the beam port of the beamformer. A salient advantage of sophisticated beamformers is that they may include a plurality of beam ports, each of which distributes the electromagnetic energy in such a fashion that different beams may be generated simultaneously.

A large number of methods and apparatus have been used to generate electronically scanned antenna beams using phased arrays made up of, or comprising, multiple radiating elements. A phased array can be formed as a linear array, as illustrated in FIG. 1, in which the radiating elements of the array are in-line. In FIG. 1, a linear array 10 includes a set 12 of antennas $12_0$, $12_\phi$, $12_{2\phi}$, $12_{3\phi}$, $12_{4\phi}$, $12_{5\phi}$, $12_{6\phi}$, $12_{7\phi}$, $12_{8\phi}$, and $12_{9\phi}$. Each of the antennas of set 12 of antennas is coupled by way of a phase shifter of a set 14 of phase shifters to a source of signal of a set 16 of sources. More particularly, antenna $12_0$ is coupled by way of a phase shifter $14_0$ to a source $16_0$. Antenna $12_\phi$ is coupled by way of a phase shifter $14_\phi$ to a signal source $16_\phi$, antenna $12_{2\phi}$ is coupled by way of a phase shifter $14_{2\phi}$ to a signal source $16_{2\phi}$, antenna $12_{3\phi}$ is coupled by way of a phase shifter $14_{3\phi}$ to a signal source $16_{3\phi}$, antenna $12_{4\phi}$ is coupled by way of a phase shifter $14_{4\phi}$ to a signal source $16_{4\phi}$, antenna $12_{5\phi}$ is coupled by way of a phase shifter $14_{5\phi}$ to a signal source $16_{5\phi}$, antenna $12_{6\phi}$ is coupled by way of a phase shifter $14_{6\phi}$ to a signal source $16_{6\phi}$, antenna $12_{7\phi}$ is coupled by way of a phase shifter $14_{7\phi}$ to a signal source $16_{7\phi}$, antenna $12_{8\phi}$ is coupled by way of a phase shifter $14_{8\phi}$ to a signal source $16_{8\phi}$, and antenna $12_{9\phi}$ is coupled by way of a phase shifter $14_{9\phi}$ to a signal source $16_{9\phi}$. Each source of set 16 of signal sources of FIG. 1 is at the same frequency f0 and in-phase. Each phase shifter of set 14 of signal sources of FIG. 1 is set to create the progressive phase shift. More particularly, phase shifter $14_0$ provides some phase shift as a reference to the other phase shifters. Phase shifter $14_\phi$ provides phase shift equal to the reference phase plus $\phi$ as shown in FIG. 1. Phase shifter $14_{2\phi}$ provides phase shift equal to the reference plus $2\phi$ and so on. So the array beam peak is steered to the angle $$\sin\theta_0 = \frac{\varphi\lambda_0}{2\pi D} \quad (1)$$

where:
D is the physical separation between antenna elements, or more properly between their phase centers;
$\lambda_0$ is the wavelength at the carrier frequency f0; and
$\theta_0$ is the angle to which the beam peak is steered or guided.

A phased array can also be formed as a planar array, such as that illustrated as 20 of FIG. 2. In FIG. 2, planar array 20 includes six rows I, II, III, IV, V, and VI of antenna arrays, any one of which may be similar to array 10 of FIG. 1. In FIG. 2, row I is illustrated as including the antennas of array 10 of FIG. 1. Of course, planar array 20 may contain more or fewer rows than six, and each row may contain more or fewer antennas than nine.

Linear phased arrays may also be subdivided into overlapping and nonoverlapping subarrays. A nonoverlapping array is illustrated by 30 in FIG. 3. In FIG. 3, antenna array 30 includes a linear array of 32 antenna elements included within eight antenna subarrays of a set 31 of subarrays. Of course, array 30 may contain more or fewer than 4 elements in subarray and more than 8 subarrays. Each row 30 can be part of planar array similar to FIG. 2. Each subarray of set 31 is fed by a summing or dividing circuit (E) of a set 38 of subarrays. Each summing circuit of set 38 of summing or dividing circuits is, in turn, fed by a phase shifter of a set 34 of phase shifters from a source of a set of sources 36. More particularly, a subset $31_1$ of antenna element subset 31 includes antenna elements $32_1$, $32_2$, $32_3$, and $32_4$, each of which is fed from an output port of a summing or dividing circuit $38_1$. The common port $38_1$c of summing or dividing circuit $38_1$ is fed by a phase shifter $34_1$ from a source $36_1$. Similarly, a subset $31_2$ of antenna element subset 31 includes antenna elements $32_5$, $32_6$, $32_7$, and $32_8$, each of which is fed from an output port of a summing or dividing circuit $38_2$. The common port $38_2$c of summing or dividing circuit $38_2$ is fed by a phase shifter $34_2$ from a source $36_2$. A subset $31_3$ of antenna element subset 31 includes antenna elements $32_9$, $32_{16}$, $32_{11}$, and $32_{12}$, each of which is fed from an output port of a summing or dividing circuit $38_3$. The common port $38_{3C}$ of summing or dividing circuit $38_3$ is fed by a phase shifter $34_3$ from a source $36_3$. There may be many subarrays in the array 30 of FIG. 3, and the last subarray is illustrated as $31_N$. Subarray $31_N$ includes antenna elements $32_{29}$, $32_{30}$, $32_{31}$, and $32_{32}$, each of which is fed from an output port of a summing or dividing circuit $38_N$. The common port $38_{NC}$ of summing or dividing circuit $38_N$ is fed by a phase shifter $34_N$ from a source $36_N$. As in the case of the array of FIG. 1, all the sources of set 36 of sources are at the same frequency and phase.

Linear phased arrays may also be combined into overlapping subarrays, as illustrated in simplified form by array 40 in FIG. 4. In FIG. 4, overlapping linear array 40 includes 32 antenna elements, illustrated on different lines to clarify the subdivisions. The uppermost line $41_1$ includes twelve mutually adjacent elements. The left-most 4 elements in line $41_1$ are fed at a frequency of f0 by a phase shifter and source $42_1$. The next 4 elements in line $41_1$ (elements 5 through 8 from the left) are fed simultaneously from first phase shifter and source $42_1$ and a second phase shifter and source $42_2$. The last 4 elements in line $41_1$ (elements 9 through 12 from the left) are fed simultaneously from first phase shifter and source $42_1$, second phase shifter and source $42_2$ and a third phase shifter and source $42_3$. In the second-from-top line $41_2$ of antenna elements, four additional antenna elements (at the right of the line) are fed simultaneously from phase shifter and sources $42_2$, $42_3$, and $42_4$. The third-from-top line $41_3$ of antenna elements includes four additional antenna elements, all of which are fed simultaneously from phase shifter and sources $42_3$, $42_4$, and $42_5$. The fourth-from-top line $41_4$ of antenna elements includes four additional antenna elements, all of which are fed simultaneously from phase shifter and sources $42_4$, $42_5$, and $42_6$. The fifth-from-top line $41_5$ of antenna elements includes four additional antenna elements, all of which are fed simultaneously from phase shifter and sources $42_5$ and $42_6$. The right-most four antenna elements of row $41_6$ are fed from phase shifter and source $42_6$.

Another known approach to electronic scanning is a technique which may be referred to as ultra-fast "within-pulse-electronic-sector-scanning" (WPESS), which can be found in various references, such as

| [1] | U.S. Pat. No. 2,426,460 | August 1947 | Lewis |
| [2] | U.S. Pat. No. 3,012,244 | November 1961 | Langenwalter et al. |
| [3] | U.S. Pat. No. 5,943,010 | August 1999 | Rudish et el. |
| [4] | U.S. Pat. No. 5,541,607 | July 1996 | Reinhardt |
| [5] | U.S. Pat. No. 6,531,976 | March 2003 | Yu |
| [6] | U.S. Pat. No. 6,624,783 | September 2003 | Rabideau |
| [7] | U.S. Pat. No. 6,778,137 | August 2004 | Krikorian et al. |

Samuel M. Sherman, Monopulse Principles and Techniques, Artech House, Norwood, Mass., 1984

Within-pulse-electronic-sector-scanning (WPESS) is based on progressive frequency offset between the adjacent radiating elements. Progressive frequency offset is illustrated in FIG. 5 for the case of a linear array 512 of antenna elements. In FIG. 5, linear array 512 includes antenna elements designated $512_0$, $512_1$, $512_2$, $512_2$, $512_4$, $512_5$, $512_6$, $512_7$, $512_8$, and $512_9$. Each antenna element of FIG. 5 is driven by a signal source at a frequency defined by the frequency shown on the bottom of each antenna. For example, antenna element $512_0$ is driven at a frequency f0, antenna element $512_1$ is driven at a frequency f0–Δf, antenna element $512_2$ is driven at a frequency f0–2Δf, antenna element $512_3$ is driven at a frequency f0–3Δf, antenna element $512_4$ is driven at a frequency f0–4Δf, antenna element $512_5$ is driven at a frequency f0–5Δf, antenna element $512_6$ is driven at a frequency f0–6Δf, antenna element $512_7$ is driven at a frequency f0–7Δf, antenna element $512_8$ is driven at a frequency f0–8Δf, and antenna element $512_9$ is driven at a frequency f0–9Δf. The differential phase shift between far field components radiated by antenna $512_0$ and antenna $512_n$ is $$\phi_n = -2\pi n\Delta ft + nkd \sin\theta \quad (2)$$

and includes time-dependent progressive phase shift with decrement $-2\pi\Delta ft$. So the linear array 512 beam peak position becomes determinable from $$\sin\theta_0(t) = \frac{2\pi\Delta f}{kd} t \quad (3)$$

Therefore, all the phase shifters of set 14 in FIG. 1 can be removed and replaced by the set of local oscillators with frequency offset Δf, 2Δf, 3Δf . . . as shown in FIG. 5. The beam steering velocity and angular coverage is controlled by the value of frequency offset and must be matched with pulse duration. The f0 carrier oscillator driving antenna $512_0$ of FIG. 5 may be viewed as being a phase or frequency reference to which other phases or frequencies may be referred. The phase or frequency reference may be at a location within the array, rather than at an end thereof as illustrated.

A full scan of a sector of several tens of degrees is usually required for any volume search radar (VSR). If this sector is covered during a single pulse using Within-pulse-electronic-sector-scanning (WPESS) technique, all targets within this angular sector are illuminated in sequence and the return signals therefrom can be processed. The main disadvantage of the "within-pulse-electronic-sector-scanning" (WPESS) architecture of the prior art is poor signal-to-noise ratio. This poor signal-to-noise ratio occurs because fast scan means short time of target illumination, and consequently results in less energy being reflected toward the receiver from the target. Some signal-to-noise ratio loss can be reduced by integration of several returns from the target. However, this multi-pulse processing is limited in accuracy by the scintillation effect, glint, propagation and multipath errors, jamming, and the like, as set forth in reference [8].

Improved or alternative electromagnetic target acquisition and tracking techniques are desired.

SUMMARY OF THE DISCLOSURE

A radar system comprises an electromagnetic transmitter and an array of antenna elements connected in Multiple-Input Multiple-Output manner for routing signals reflected from the target to a plurality of receive beam rotation processors. The receive beam rotation processing for each antenna element includes application of rotation frequency offsets to the received signals and summation in summing and differencing adders to generate I and Q components of the rotating beams. The I and Q components for each element are summed to generate received signals including angle-or-arrival (AOA) information. The AOA information is further processed by correlating with reference replica AOA signals and by averaging to determine the actual AOA. The transmitter may have multiple contrarotating beams generated by application of frequency offsets. The transmit and receive beam rotations may be synchronized.

A method for locating a target according to an aspect of the disclosure comprises the steps of receiving RF signals from a target at each element of an antenna array, and dividing the RF signal power from each element into equal portions, to thereby generate a plurality of divided signals for each antenna element. Mutually frequency-offset multiplication signals are generated, and each of the divided signals is modulated by one of the multiplication signals, so as to thereby generate positive and negative frequency offset received signals. All of the negative frequency offset received signals from all of the antenna elements are combined to thereby generate CW received beam signals, and all of the positive frequency offset received signals from all of the antenna elements are combined to thereby generate CCW received beam signals. In a particular mode, the method further comprises the steps of generating complex CW and CCW signals from the received beam signals, and generating replica signals which represent a plurality of targets at different angles of arrival. The received CW and CCW beam signals are correlated with the replica signals, to thereby generate correlated signals. The angle of arrival of signal from the target is deemed to equal the angle of the maximum value of correlation. In a particular mode of the method, the step of receiving RF signals from a target at each element of an antenna array comprises the step of receiving RF signals reflected from a target at each element of an antenna array.

An apparatus for locating a target comprises an antenna array for receiving RF signals from a target at each element to thereby generate RF signal power from each element comprises a divider arrangement for dividing the RF signal power from each element into equal portions, to thereby generate a plurality of divided signals for each antenna element, and a source of mutually frequency-offset multiplication signals. A modulator is provided for modulating each of the divided signals by one of the multiplication signals, so as to thereby generate positive- and negative-frequency offset received signals. A first combiner combines all of the negative frequency offset received signals from all of the antenna elements to thereby generate CW received beam signals, and a second combiner combines all of the positive frequency offset received signals from all of the antenna elements to thereby generate CCW received beam signals. A particular embodiment further comprises an I and Q complex signal generator arrangement coupled to the first and second combiners for generating complex CW and CCW signals from the received beam signals. A replica signal generating arrangement generates replica signals which represent a plurality of targets at different angles of arrival. A correlator arrangement is coupled to the replica signal generator arrangement and to the complex signal generator arrangement, for correlating the received CW and CCW beam signals with the replica signals, to thereby generate correlated signals. A processor is coupled to receive the correlated signals for deeming the angle of arrival of signal from the target to equal the angle of the maximum value of correlation. A further embodiment comprises a transmitter for transmitting electromagnetic signals toward the target for generating return RF signals for reception by the elements of the antenna array.

An electromagnetic transmitter arrangement according to an aspect of the disclosure comprises one of an antenna line array and subarray. The one of the line array and subarray defines at least first and second ends. The one of the line array and subarray includes at least first, second, third, fourth, and fifth antenna elements, with the first antenna element at the first end of the one of the line array and subarray, the fifth antenna element at the second end of the one of the line array and subarray, the third antenna element at the center of the one of the line array and subarray, the second antenna element lying between the first and third antenna elements, and the fourth antenna element lying between the third and fifth antenna elements. First, second, third, fourth, and fifth radio-frequency signal sources are provided. The first signal source generates signals at frequency of f0, the second signal source generates frequencies of f0±Δf, where the symbol ± means "plus and minus." The third signal source generates frequencies of f0±2Δf, the fourth signal source generates frequencies of f0±3Δf, and the fifth signal source generates frequencies of f0±4Δf. A first radio-frequency signal path extends from the first signal source to the first antenna element, a second radio-frequency signal path extends from the second signal source to the second antenna element, a third radio-frequency signal path extends from the third signal source to the third antenna element, a fourth radio-frequency signal path extends from the fourth signal source to the fourth antenna element, and a fifth radio-frequency signal path extends from the fifth signal source to the fifth antenna element. In a particular embodiment of the electromagnetic transmitter arrangement, the one of an antenna line array and subarray is part of a planar array. In another particular embodiment, each of the first, second, third, fourth, and fifth radio-frequency signal paths includes one of a phase shifter and a time-delay element. In yet another particular embodiment, each of the first, second, third, fourth, and fifth radio-frequency signal paths includes at least one of a phase shifter, an amplifier, and a circulator. In a further embodiment, the first, second, third, fourth, and fifth radio-frequency signal sources transmit their respective signals in a synchronized manner.

A radar system for locating a target with an Active Electronically Scanning Array (AESA) transmitting simultaneously at least, or as minimum, two steered-continuously-in-time and in opposite direction beams (clockwise and counterclockwise beams) and consisting of plurality of linear arrays, where each linear array comprises one of a plurality of single radiators, a plurality of subarrays, and a plurality of overlapped subarrays. An embodiment of this radar system with an AESA comprises a plurality of linear arrays, each the linear array including an electromagnetic transmitter arrangement and an electromagnetic receiver arrangement. The electromagnetic transmitter arrangement comprises a first radio-frequency Tx signal of f0 path from Tx feed extended from Tx driver to a dither block with search switch generating zero frequency offset such as the signal on path has frequency f0, the signal of f0 goes through discrete Tx phase shifter to HPA, circulator and radiated by an element of the linear array; second radio-frequency Tx signal of f0 path from Tx feed extended from Tx driver to the dither block with search switch generating frequency offset ±Δf such as the signal on path has frequency f0±Δf, the signal of f0±Δf goes through discrete Tx phase shifter to HPA, circulator and radiated by an element of the linear array, and a Tx driver for generating a radio-frequency synchronization Tx signal of frequency f0. The electromagnetic receiver arrangement comprises first CW and CCW radio-frequency Rx signals received by an element of the linear array going through circulator, LNA, discrete Rx phase shifter synchronized with discrete Tx phase shifter through path, and through path goes to receiver Rx processing block. The electromagnetic receiver arrangement also comprises second CW and CCW radio-frequency Rx signals received by an element of the linear array goes through circulator, LNA, discrete Rx phase shifter synchronized with discrete Tx phase shifter through path, and through path goes to receiver Rx block. A receiver processing block comprising of Rx feed to the same as the Tx feed combining all the received signals, to thereby produce the combined CW and CCW received signal on path of Rx processing block. A baseband downconverter combines with A/D converter and synchronized by reference Tx signal of frequency f0 through path. A replica generator for generating replica of clockwise signal and a replica generator for generating replica of counterclockwise signal produced by the sources of the electromagnetic transmitter. A first correlator is coupled to receive combined CW and CCW signal through path and replica CW signal coming from replica generator to thereby produce clockwise beam signals. A second correlator is coupled to receive combined CW and CCW signal through path and replica CCW signal coming from replica generator to thereby produce counterclockwise beam signals. Filters are coupled to receive the clockwise and counterclockwise correlated signals, for filtering the clockwise and counterclockwise correlated signals to reduce noise. The radar system also includes a precomputed lookup table of plurality of clockwise signal replicas corresponding to expected CWa signals scattered by target(s) at different Angles of Arrival (AOAs) and a precomputed lookup table of plurality of counterclockwise signal replicas corresponding to expected CCW signals scattered by target(s) at different AOAs. A first correlator is coupled to received CW signal through path and replicas of CW signal of different AOAs coming from replica generator to thereby produce target AOA estimation. A second correlator is coupled to received CCW signal through path and replicas of CCW signal of different AOAs coming from replica generator to thereby produce target AOA estimation. A processor arrangement provides smoothing, pulse compression, Mini-Max procedure or any other method to mitigate additionally signal-to-noise ratio and improve radar accuracy and resolution.

A dither block responsive to a digital signal representing the Tx pulse duration and also responsive to a reference clock. The dither block comprises a microprocessor forming numerical lookup table of function $$\cos\left(\frac{2.76}{N-1}T\right), T = mt/\tau$$

in response to the Tx pulse duration τ through path, and synchronized by the reference clock signal. The dither block also comprises a digital-to-analog converter with filter synchronized by the reference clock, for converting numerical signal from lookup table block into continuous signal cos (mΔft). The dither block further comprises a mixer creating in-phase signals with dual frequencies ±mΔf of equal magnitude.

An electromagnetic transmitter arrangement comprises an antenna subarray. The subarray comprises first, second, third, fourth, fifth, sixth, seventh, eighth, and ninth antenna elements arranged in first, second, and third rows orthogonally intersecting first, second, and third columns, with the first antenna element lying at the intersection of the first row and the first column, the second antenna element lying at the intersection of the first row and the second column, the third antenna element lying at the intersection of the first row and the third column, the fourth antenna element lying at the intersection of the second row and the first column, the fifth antenna element lying at the intersection of the second row and the second column, the sixth antenna element lying at the intersection of the second row and the third column, the seventh antenna element lying at the intersection of the third row and the first column, the eighth antenna element lying at the intersection of the third row and the second column, and the ninth antenna element lying at the intersection of the third row and the third column. The electromagnetic transmitter arrangement comprises first, second, third, fourth, fifth, sixth, seventh, eighth, and ninth radio-frequency signal sources, the first, second, third, fourth, fifth, sixth, seventh, eighth, and ninth signal sources generating radio-frequency signals at frequencies f0±8Δf±f0& f0, f0±7Δf±f0& f0, f0±6Δf±f0& f0, f0±8Δf±δf, f0+7Δf±δf, f0+6Δf±δf, f0±8Δf±2Δf, f0±7Δf±2δf, f0±6Δf±2δf, respectively. First, second, third, fourth, fifth, sixth, seventh, eighth, and ninth coupling elements interconnect the first, second, third, fourth, fifth, sixth, seventh, eighth, and ninth antenna elements with the first, second, third, fourth, fifth, sixth, seventh, eighth, and ninth radio-frequency signal sources, respectively. In a particular embodiment of the electromagnetic transmitter arrangement, the coupling elements include one of phase shifters and time delays.

An electromagnetic transmitter arrangement comprises an antenna subarray. The antenna subarray comprises first, second, third, fourth, fifth, sixth, seventh, eighth, and ninth antenna elements arranged in first, second, and third rows orthogonally intersecting first, second, and third columns, with the first antenna element lying at the intersection of the first row and the first column, the second antenna element lying at the intersection of the first row and the second column, the third antenna element lying at the intersection of the first row and the third column, the fourth antenna element lying at the intersection of the second row and the first column, the fifth antenna element lying at the intersection of the second row and the second column, the sixth antenna element lying at the intersection of the second row and the third column, the seventh antenna element lying at the intersection of the third row and the first column, the eighth antenna element lying at the intersection of the third row and the second column, and the ninth antenna element lying at the intersection of the third row and the third column. The electromagnetic transmitter arrangement further comprises first, second, third, fourth, fifth, sixth, seventh, eighth, and ninth radio-frequency signal sources, the first, second, third, fourth, fifth, sixth, seventh, eighth, and ninth signal sources generating radio-frequency signals at a carrier frequency, where the carrier frequency changes from element to element to define a first frequency gradient in the column direction of the array and to define a second frequency gradient in the row directions of the array. In a particular embodiment of the electromagnetic transmitter arrangement, the first and second frequency gradients are mutually different. The first frequency gradient may be a stepwise frequency gradient Δf and the second frequency gradient may be a stepwise frequency gradient δf.

An electromagnetic transmitter arrangement comprises one of an antenna line array and subarray. The one of the line array and subarray defines at least first and second ends. The one of the line array and subarray includes at least first, second, third, fourth, and fifth antenna elements, with the first antenna element at the first end of the one of the line array and subarray, the fifth antenna element at the second end of the one of the line array and subarray, the third antenna element at the center of the one of the line array and subarray, the second antenna element lying between the first and third antenna elements, and the fourth antenna element lying between the third and fifth antenna elements. The electromagnetic transmitter arrangement also comprises first, second, third, fourth, and fifth radio-frequency signal sources, the first signal source generating signals at frequency of f0, the second signal source generating frequencies of f0±Δf, where the symbol ± means "plus and minus," the third signal source generating frequencies of f0±2Δf, the fourth signal source generating frequencies of f0±3Δf, and the fifth signal source generating frequencies of f0±4Δf. The first signal source may comprise two synchronized sources. A first radio-frequency signal path extends from the first signal source to the first antenna element, a second radio-frequency signal path extends from the second signal source to the second antenna element, a third radio-frequency signal path extends from the third signal source to the third antenna element, a fourth radio-frequency signal path extends from the fourth signal source to the fourth antenna element, and a fifth radio-frequency signal path extends from the fifth signal source to the fifth antenna element. The one of an antenna line array and subarray may be part of a planar array. Each of the first, second, third, fourth, and fifth radio-frequency signal paths in one version includes one of a phase shifter and a time-delay element. Each of the first, second, third, fourth, and fifth radio-frequency signal paths in another version includes at least one of a phase shifter, an amplifier, and a circulator. The first, second, third, fourth, and fifth radio-frequency signal sources may transmit their respective signals in a synchronized manner.

BRIEF DESCRIPTION OF THE DRAWINGS

FIG. 5 is a simplified illustrative diagram of a linear array antenna with frequency offset as known in the prior art;

FIG. 6A is a simplified illustrative diagram of a linear array transmit antenna with frequency dither or frequency gradient in accordance with an aspect of the disclosure, FIG. 6C illustrates two beam patterns formed by a linear array transmit antenna with frequency dither as in FIG. 6A.

FIG. 9A is an illustrative diagram of a planar array transmit antenna with multi tone frequency dither in accordance with an aspect of the disclosure, FIG. 9B is a notional diagram of a four-beam pattern formed by the planar array transmit antenna with frequency dither of FIG. 9A.

FIG. 13 tabulates the results of numerical simulation of dither radar AOA accuracy in comparison with monopulse radar.

DETAILED DESCRIPTION

Any modern air defense network includes many types of radar such as acquisition, early warning, height finders, ground controlled intercept, airborne fire control, missile guidance, target tracking, anti-aircraft artillery, etc. This wide variety of radars is required because each of the radars is highly specialized and can perform only quite restricted functions. The early warning radar, for example, typically can provide target detection and heading at long ranges such as several thousand kilometers by virtue of its high powered transmitter and very sensitive receiver, but does not provide auto-track capability because of the low carrier frequency and broad antenna beam. Since the accuracy of the radar is a measure of its ability to locate the power centroid of signals scattered from targets and to align its antenna so that the centroid is on the antenna axis, the broad antenna beam correspondingly means low radar accuracy with short volume search time.

Target tracking radars provide much higher accuracy, but require narrow, rather than broad, antenna beams. Since the beamwidth is the inverse function of frequency, target tracking radar implies higher frequency. The higher frequencies are more sensitive to atmospheric conditions, so cannot be as readily used at long ranges. As a result, tracking radar isn't ordinarily used as search radar, and tracking radar starts its search after an early warning radar detects the target. Thus, any existing high accuracy ground or sea long range radar system includes, as a minimum, two very sophisticated radars, each with a large active phased array antenna. This approach is very expensive, and a large amount of valuable space may be required to set these multiple radars on the same platform. If the VSR angular accuracy and resolution can be improved by a factor of at least three or four, the second higher frequency radar can be unnecessary. The dither technique according to aspects of the disclosure allows achievement of this goal.

Figure 6B:
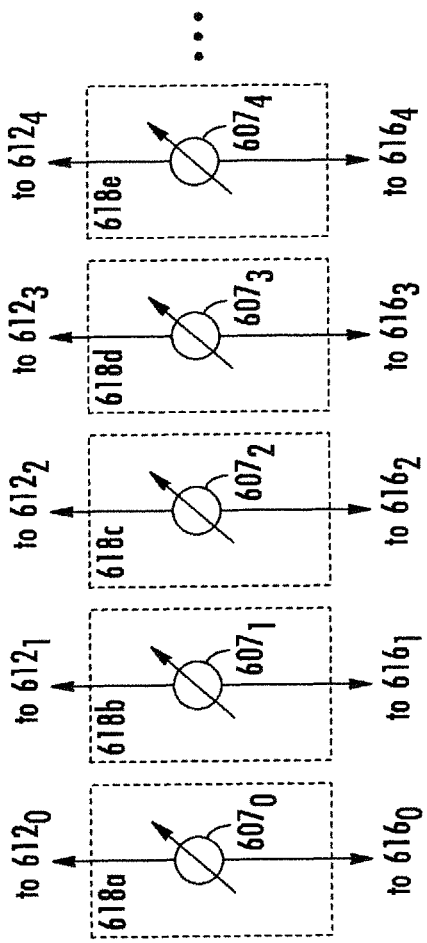
FIG. 6B is a simplified illustrative diagram of an alternate arrangement of a portion of FIG. 6A.

FIG. 6A is a simplified block diagram of a linear transmit antenna array 612 according to an aspect of the disclosure. In FIG. 6A, the elements of an antenna array 612 include antenna elements $612_0$, $612_1$, $612_2$, $612_3$, $612_4$, $612_5$, $612_6$, $612_7$, $612_8$, $612_9$. Those skilled in the art will understand that the number of elements in array 612 may be greater or less than the nine elements illustrated. In FIG. 6A, an array or set 616 of radio-frequency (RF) signal sources includes sources $616_0$, $616_1$, $616_2$, $616_3$, $616_4$, $616_5$, $616_6$, $616_7$, $616_8$, and $616_9$. Each signal source of set 616 produces complex RF signal consisting of two related frequency components. More particularly, signal source $616_1$ produces RF signal at frequencies of f0±Δf, where the symbol ± means "plus and minus." Similarly, signal sources $616_2$, $616_3$, $616_4$, $616_5$, $616_6$, $616_7$, $616_8$, and $616_9$ produce RF signal at frequencies of f0±2Δf, f0±3Δf, f0±4Δf, f0±5Δf, f0±6Δf, f0±7Δf, f0±8Δf, and f0±9Δf, respectively. Also in FIG. 6A signal source $616_0$ produces RF signal of double amplitude at a frequency of f0 and all other signals have the "reference" phase and frequency f0. The signals produced by array 616 of sources are applied by way of a set of paths 618 to corresponding ones of the antenna array 612 or subarray 613. More particularly, the signal at frequency f0 produced by source $616_0$ is applied by way of a path $618_0$ to antenna element $612_0$. Similarly, the signal at frequency f0±Δf produced by source $616_1$ is applied by way of a path $618_1$ to antenna element $612_1$. In the same manner, the signal at frequency f0±2Δf produced by source $616_2$ is applied by way of a path 618c to antenna element $612_2$, the signal at frequency f0±3Δf produced by source $616_3$ is applied by way of a path 618d to antenna element $612_3$, and the signal at frequency f0±4Δf produced by source $616_4$ is applied by way of a path 618e to antenna element $612_4$. Corresponding signals produced by other signal sources of set 616 of signal sources are applied by other paths of set 618 of paths to others of the antenna elements of antenna array 612. The only reason for identifying subarray 613 is to make it clear that the principles applicable to the array 600 as a whole also apply to portions or subarrays thereof. While the signal paths of set 618 of signal paths of FIG. 6A are illustrated as being simple conductors, those skilled in the art will understand that each individual signal path of set 618 may include a phase shifting arrangement, as illustrated by phase shifters $607_0$, $607_1$, $607_2$, $607_3$, and $607_4$ in FIG. 6B. The purpose of the phase shifting arrangement of FIG. 6B is to provide beam steering for volume search. Instead of a phase shifting arrangement, the paths 618 may include delay elements.

Figure 6F:
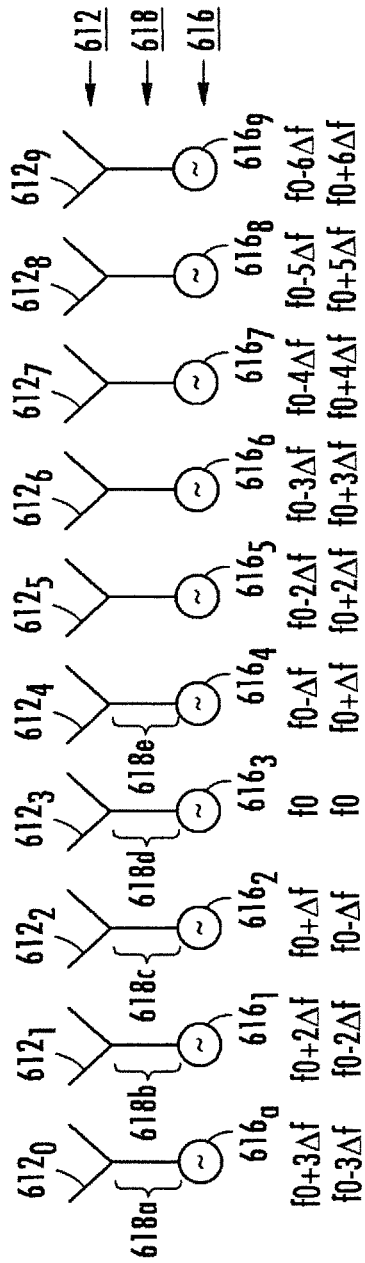
FIG. 6F is similar to FIG. 6A.

Since the reference frequency value of f0 of FIG. 6A may be located anywhere along the length of the array rather than at the left end of the array as shown, those skilled in the art will understand that the frequency gradient or progression may need to be adjusted. FIG. 6F is similar to FIG. 6A, but differs in that the frequency reference value f0 is located within the body of the array, at antenna element $612_3$. The first three values from the left are f0±3Δf, f0±2Δf, and f0±Δf).

Thus, in FIG. 6A, each antenna element in linear array 612 (or correspondingly in linear subarray 613) is driven simultaneously by two signals or two dither tones, namely f0−(n−1)Δf and f0+(n−1)Δf, where n is the element order number as counted from the left end of the array. The electromagnetic signal F(θ,t) that is radiated by linear uniformly excited transmit array 612 is given by equation (4) as $$F(\theta,t)=N(\exp(j(N-1)u_+/2)*\text{diric}(u_+,N)+\exp(j(N-1)u_-/2)*\text{diric}(u_-,N))*\exp(j2\pi f_o t') \quad (4)$$

where:
u+=+2πΔft'+(2πD/λ)sin(θ)
u−=−2πΔft'+(2πD/λ)sin(θ)
diric(u,N)=Diriclet function as defined in MATLAB™
Δf=dither frequency in radians per second (rad/sec)
t'=t−R0/c (sec)
D=inter-element spacing (m)
λ=carrier frequency wavelength (m)
t=current time (sec)
θ=bearing angle (rad)
f0=carrier frequency (rad/sec)
R0=target range (m)
c=velocity of light (m/sec)

Uniform amplitude expressed in equation (4) is selected for simplification only, and thus the weighting of each element is considered to be unity. These weightings may be changed to address issues of gain, directivity, and sidelobe level. The first term of equation (4) inside the parentheses, namely N(exp(j(N−1)$u_+$/2) diric($u_+$,N)), corresponds to the beam squinting continuously in time away from boresight in the counterclockwise (CCW) direction, and the second term, namely N(exp(j(N−1)$u_-$/2)diric(u,N)), corresponds to the beam squinting in the opposite or clockwise (CW) direction, as illustrated in FIG. 6C. These two terms differ in that the subscript of u takes on the values of + and −. Those skilled in the art will recognize that the clockwise (CW) beam 634 and counterclockwise (CCW) beam 636 illustrated in FIG. 6C are, in principle, figures of revolution about the axis of the line array. In practice, the line array may not be omnidirectional about the array axis, which will prevent or affect generation of a full figure of revolution. In accordance with aspects of the disclosure, the continuous squinting allows covering the search sector two times faster than can be accomplished by radar with conventional "within-pulse-electronic-sector-scanning" (WPESS), and allows realization of effective signal processing of return signals scattered from the target. Also, such arrangement allows a VSR to be a conventional or prior-art volume search radar for the primary search, and then after a target or group of targets within the antenna beamwidth is detected, this radar provides high precision angular target or targets position estimation using fast double frequency steering within beamwidth.

As mentioned, it is desirable to maintain high signal-to-noise ratio (SNR) in a radar system. For best SNR results, it is desirable to use dither steering only within the array beamwidth. This means the maximum scan of the beams during the period of a single transmit pulse is equal to the 3 dB beamwidth. The pulse duration required to cover the BW sector within the 3 dB Beamwidth is:

$$\tau = BW/4\Delta f \text{ seconds} \quad (5)$$

The static Beam Width (BW) of linear array 600 of FIG. 6A can be described by $$BW = 1.76/(N-1) \text{ radians} \quad (6)$$

Figure 6D:
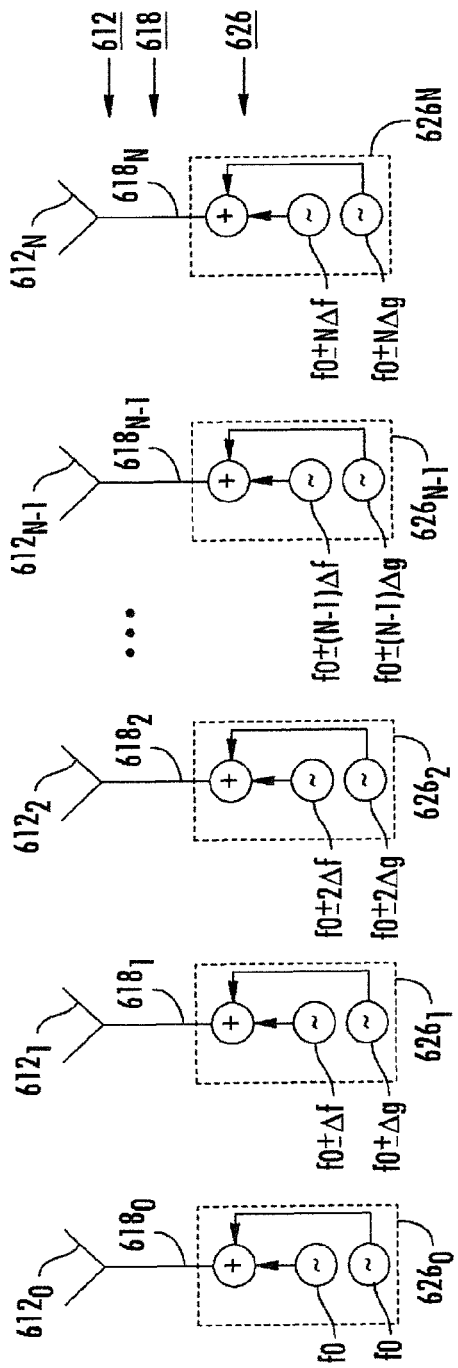
FIG. 6D is a simplified illustrative diagram of a linear array transmit antenna with multiple superposed frequency dithers or frequency gradients.
Figure 6E:
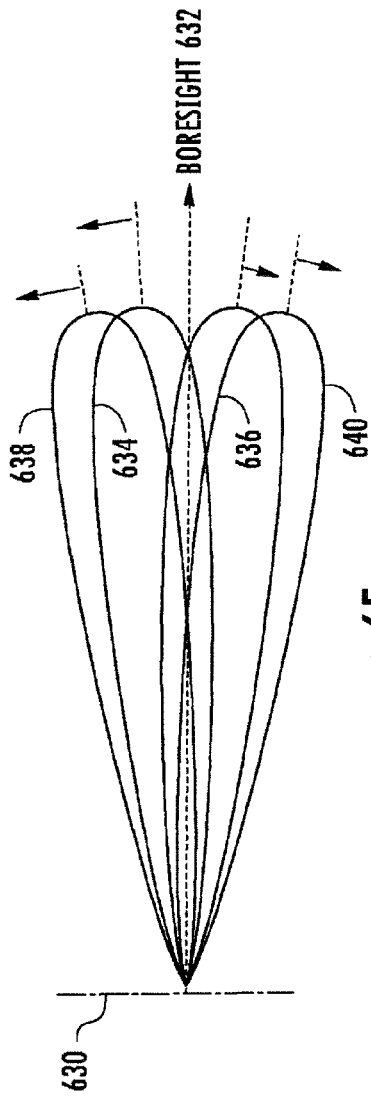
FIG. 6E illustrates four beam patterns formed by a linear array transmit antenna with frequency dither as in FIG. 6D.

More than one set of dither tones may be applied to a linear array. FIG. 6D is similar to FIG. 6A, but includes a different set of sources, which set of sources is designated 626. Each signal source $626_0$, $626_1$, $626_2$, ..., $626_{N-1}$ of set 626 produces two sets of carrier frequencies from a pair of signal generators. More particularly, signal source $626_0$ includes a summing (+) circuit which sums signals from first and second signal generators at frequencies f0 and f0 f0±Δg, where Δf and Δg are different frequency increments, and where the symbol ±represents plus and minus. Similarly, signal source $626_1$ includes a summing (+) circuit which sums signals from first and second signal generators at frequencies f0±Δf and f0±Δg, where Δf and Δg are different frequency increments, and where the symbol ± represents plus and minus. Similarly, signal source $626_2$ includes a summing (+) circuit which sums signals from first and second signal generators at frequencies f0±2Δf and f0±2Δg, ..., signal source $626_{N-1}$ includes a summing (+) circuit which sums signals from first and second signal generators at frequencies f0±(N−1)Δf and f0±(N−1)Δg.

Figure 1:
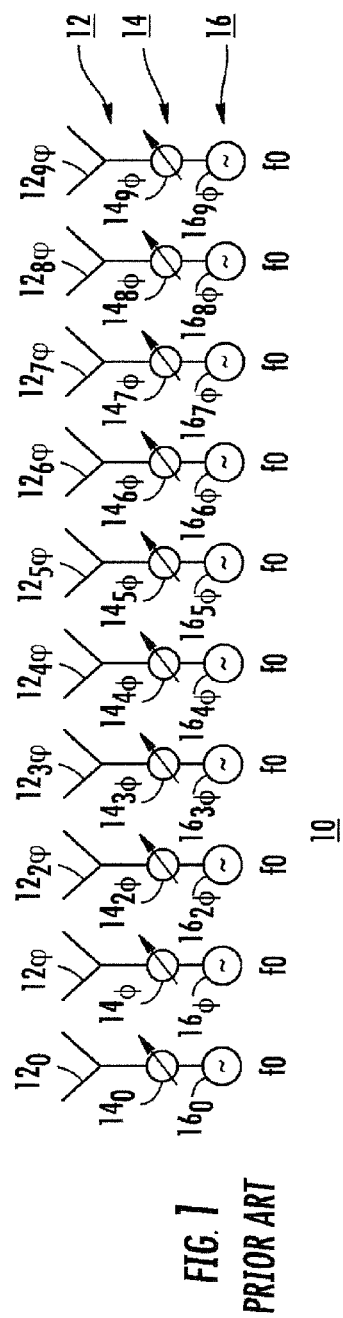
FIG. 1 is a simplified illustration of a linear array antenna using phase shifters for beam direction control as known in the prior art.
Figure 2:
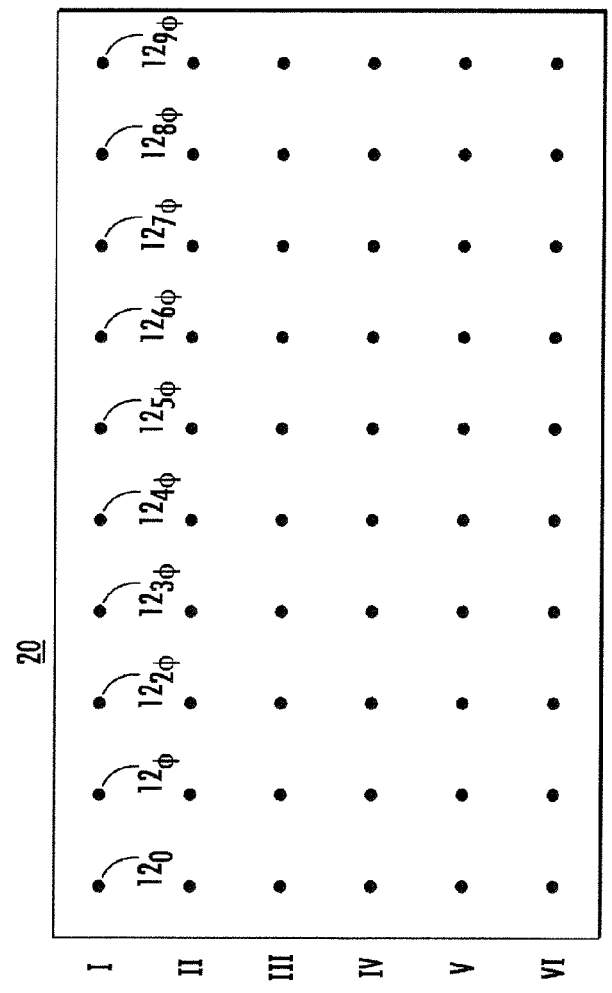
FIG. 2 is a simplified illustrative diagram of a planar array antenna as known in the prior art.
Figure 3:
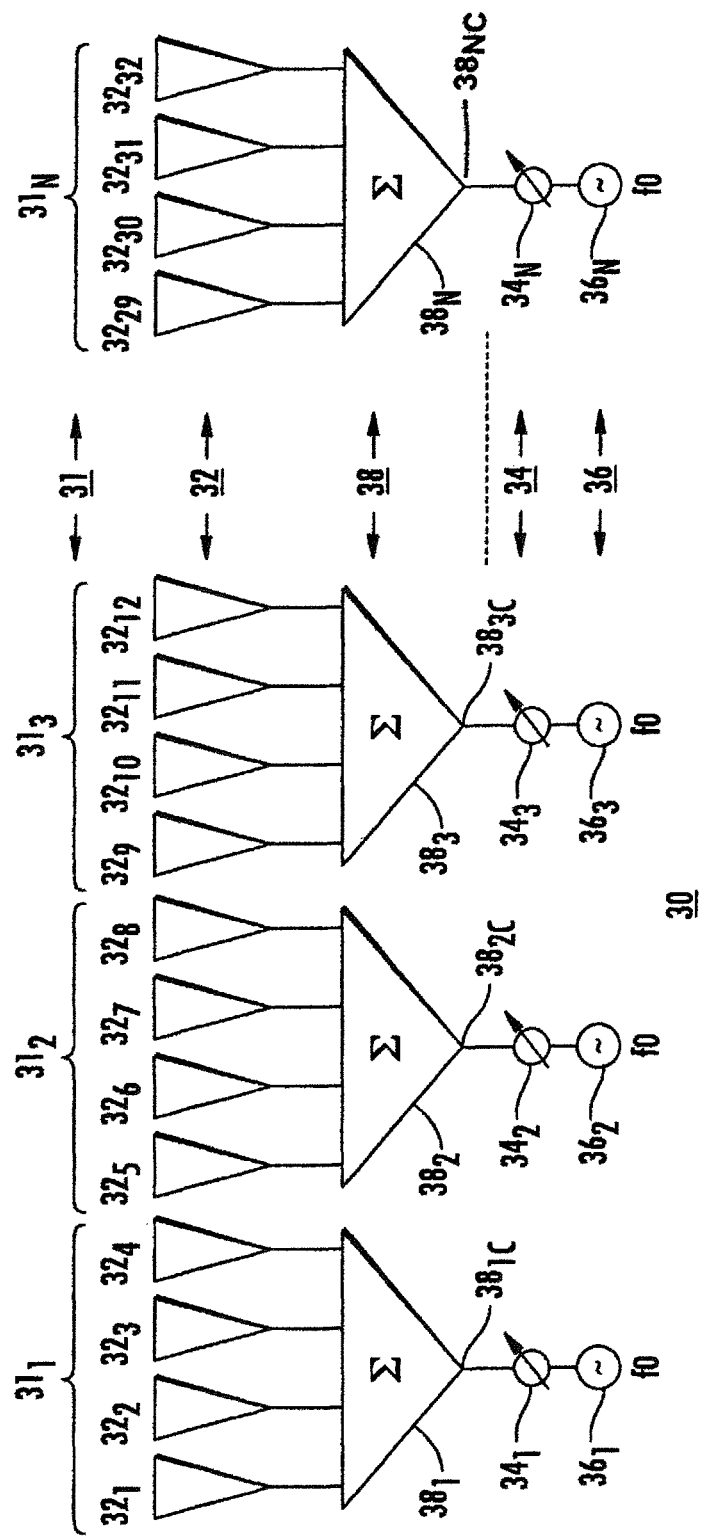
FIG. 3 is a simplified illustrative diagram of a linear array antenna with subarrays, as known in the prior art.
Figure 4:
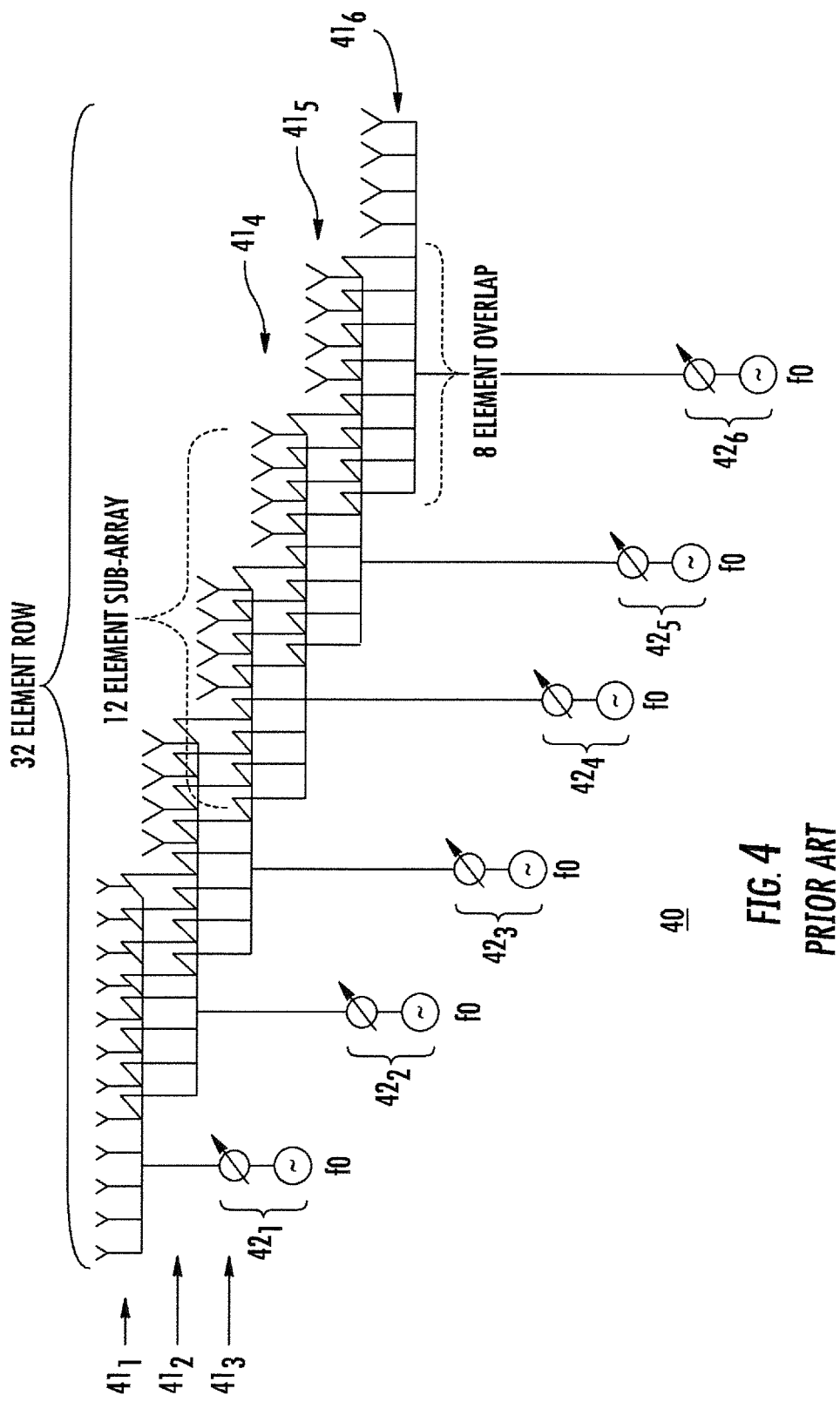
FIG. 4 is a simplified illustrative diagram of a linear array antenna with overlapped subarrays as known in the prior art.
Figure 7:
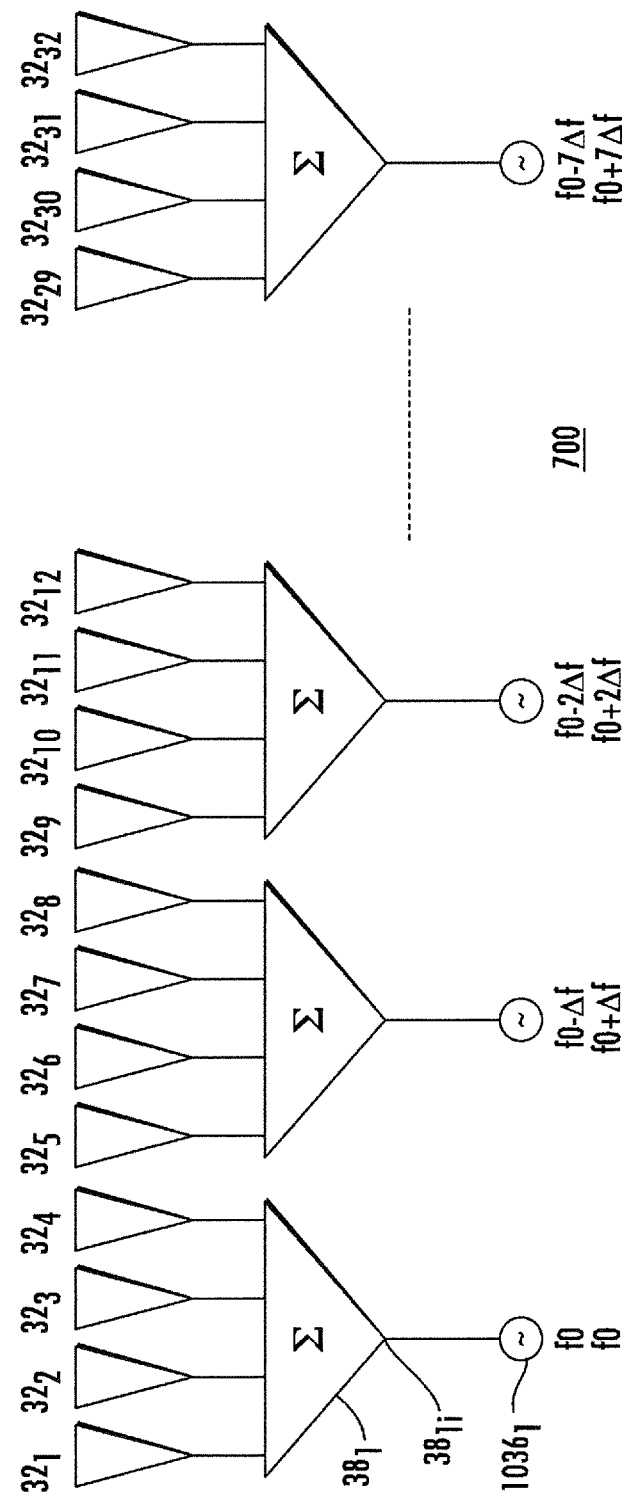
FIG. 7 is a simplified block diagram of a linear subarrayed array antenna with frequency dither or frequency gradient in accordance with an aspect of the disclosure.
Figure 8:
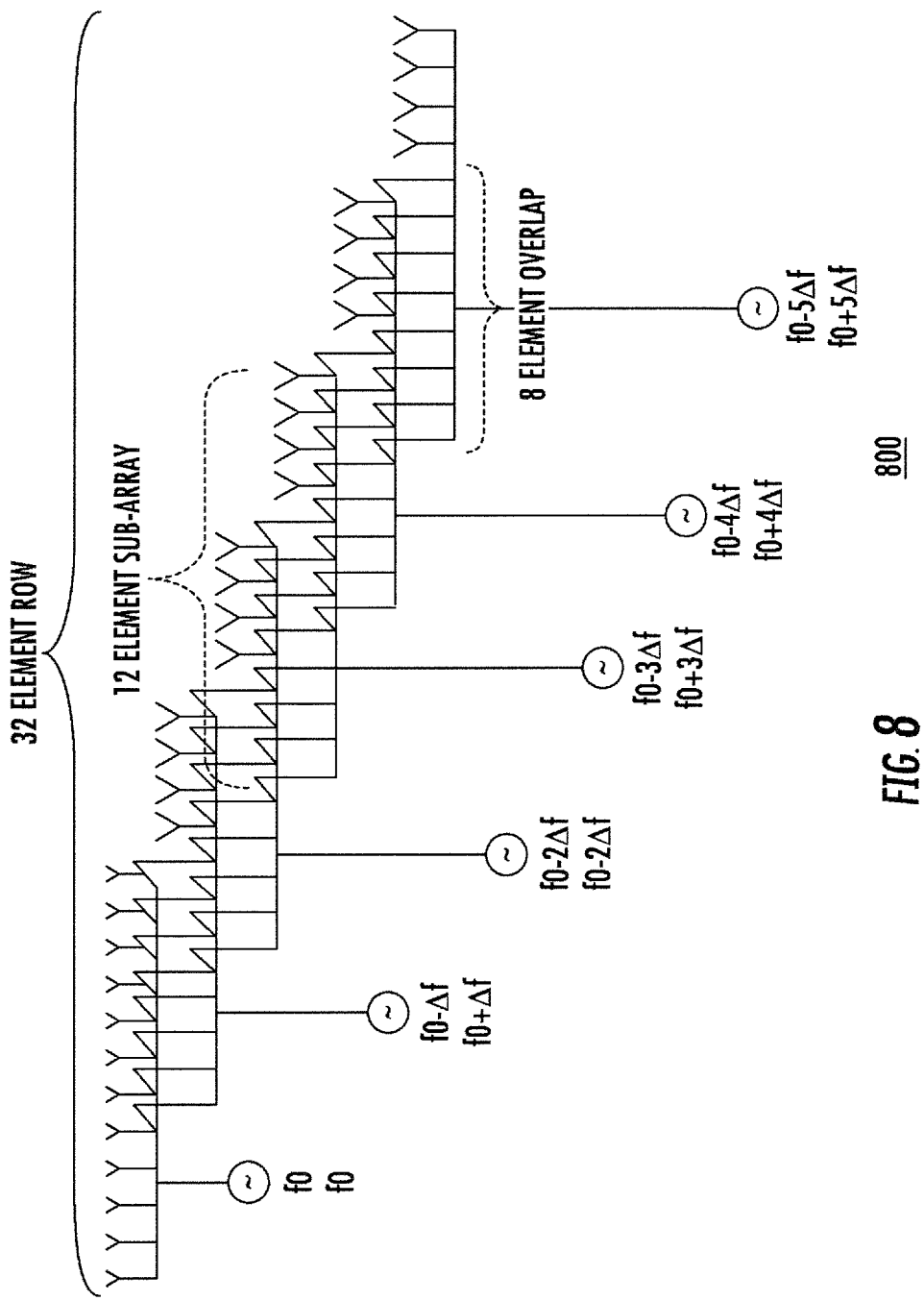
FIG. 8 is a simplified block diagram of a linear subarrayed overlapped array antenna with frequency dither or frequency gradient in accordance with an aspect of the disclosure.

A simplified embodiment of the present disclosure which applies frequency dither technique on (or at) the subarray level of a linear array of 32 elements is shown in FIG. 7. FIG. 7 is similar to FIG. 3, in that subarrays of four antenna elements are driven by way of corresponding beamformers from individual RF signal sources. In FIG. 7, the input port $38_1 i$ of beamformer $38_1$ is driven from a signal source $1036_1$, which produces signal at frequencies $f_0$ of double amplitude. The input ports of the other beamformers of FIG. 7 are driven with $f_0 \pm \Delta f$, $f_0 \pm 2\Delta f$, ..., $f_0 \pm 7\Delta f$ $f_0 \pm 2\Delta f$. FIG. 8 illustrates the application of dither frequencies to an overlapped line array of 32 elements similar to that of FIG. 4. Those skilled in the art will understand that multiple frequency offset frequency can be used to continuously steer multiple beams during the pulse duration.

FIG. 9A is a simplified representation of a two-dimensional antenna array 900 according to an aspect of the disclosure. Each array element in array 900 of FIG. 9A is represented by a circle. This embodiment is capable of 2D-scan and requires, in addition to the two tones ±Δf, the addition of only two extra tones ±δf per antenna element to steer or dither two array beams in azimuth and another two array beams in elevation. The distribution of the tones to the various elements is illustrated adjacent to the right side and the bottom of the 6×9 array of FIG. 9A. For example, in FIG. 9A the element at the junction or on the cross of the $3^{rd}$ row from the top and $5^{th}$ column from the right is excited simultaneously by a four-tone signal of f0±2δf and f0±4Δf. In FIG. 9A, the element (antenna element plus signal source) at the upper right is at the junction of row 0 and column 0, and is designated $912_{0,0}$. The elements of the array 900 of FIG. 9A in row 0 at columns 1, 2, 3, 4, 5, 6, 7, and 8 are designated $912_{1,0}$, $912_{2,0}$, $912_{2,0}$, $912_{4,0}$, $912_{5,0}$, $912_{6,0}$, $912_{7,0}$, and $912_{3,0}$, respectively. Similarly, the elements of array 900 in row I at columns 0, 1, 2, 3, 4, 5, 6, 7, and 8 are designated $912_{0,1}$, $912_{1,1}$, $912_{2,1}$, $912_{3,1}$, $912_{4,1}$, $912_{6,0}$, $912_{7,0}$, and $912_{8,0}$, respectively. The elements of array 900 in row II at columns 0, 1, 2, 3, 4, 5, 6, 7, and 8 are designated $912_{0,2}$, $912_{1,2}$, $912_{2,2}$, $912_{3,2}$, $912_{4,2}$, $912_{6,2}$, $912_{7,2}$, and $912_{8,2}$, respectively, the elements of array 900 in row III at columns 0, 1, 2, 3, 4, 5, 6, 7, and 8 are designated $912_{0,3}$, $912_{1,3}$, $912_{2,3}$, $912_{3,3}$, $912_{4,3}$, $912_{6,3}$, $912_{7,3}$, and $912_{8,3}$, the elements of array 900 in row IV at columns 0, 1, 2, 3, 4, 5, 6, 7, and 8 are designated $912_{0,4}$, $912_{1,4}$, $912_{2,4}$, $912_{3,4}$, $912_{4,4}$, $912_{6,4}$, $912_{7,0}$ and $912_{8,4}$, respectively, and the elements of array 900 in row V at columns 0, 1, 2, 3, 4, 5, 6, 7, and 8 are designated $912_{0,5}$, $912_{1,5}$, $912_{2,5}$, $912_{3,5}$, $912_{4,5}$, $912_{6,5}$, $912_{7,5}$, and $912_{8,5}$, respectively. In array 900 of FIG. 9A, the elements of column 0 are energized or driven with carrier signals at frequencies of f0,f0, the elements of column 1 are energized with carrier signals at frequencies f0−Δf and f0+Δf, the elements of column 2 are energized with signals at frequencies of f0−2Δf and f0+2Δf, the elements of column 3 are energized with signals at frequencies of f0−3Δf and f0+3Δf, the elements of column 4 are energized with signals at frequencies f0−4Δf and f0+4Δf, the elements of column 5 are energized with signals at frequencies f0−5Δf and f0+5Δf, the elements of column 6 are energized at frequencies of f0−6Δf and f0+6Δf, the elements of column 7 are energized with signals at frequencies of f0−7Δf and f0+7Δf, and the elements of column 8 are energized at frequencies of f0−8Δf and f0+8Δf. Also, the elements of row 0 of array 900 of FIG. 9A are energized or driven at frequencies of f0,f0, the elements of row I are energized at frequencies of f0−δf and f0+δf, the elements of row II are energized at frequencies of f0−2δf and f0+2δf, the elements of row III are energized at frequencies of f0−3δf, f0+3δf, the elements of row IV are energized at frequencies of f0−4δf and f0+4δf, and the elements of row V are energized at frequencies of f0−5δf and f0+5δf. Thus, each element of the array is energized by two sets of energizing signals, which may be at frequencies different from each other.

Also in FIG. 9A, a first subarray 901 defined by a dash outline includes nine array elements, namely elements $912_{6,0}$, $912_{7,0}$, $912_{8,0}$, $912_{6,1}$, $912_{7,1}$, $912_{8,1}$, $912_{6,2}$, $912_{7,2}$, and $912_{8,2}$. A second subarray 902 defined by a dot-dash outline includes four array elements, namely elements $912_{6,1}$, $912_{7,1}$, $912_{6,2}$, and $912_{7,2}$. FIG. 9B represents the beam squint resulting from application of four tones ±Δf and ±δf to each antenna element of array 900. In principle, tens, hundreds or thousands of simultaneously generated mutually contrarotating beam sets can be generated from a single array.

Figure 9C:
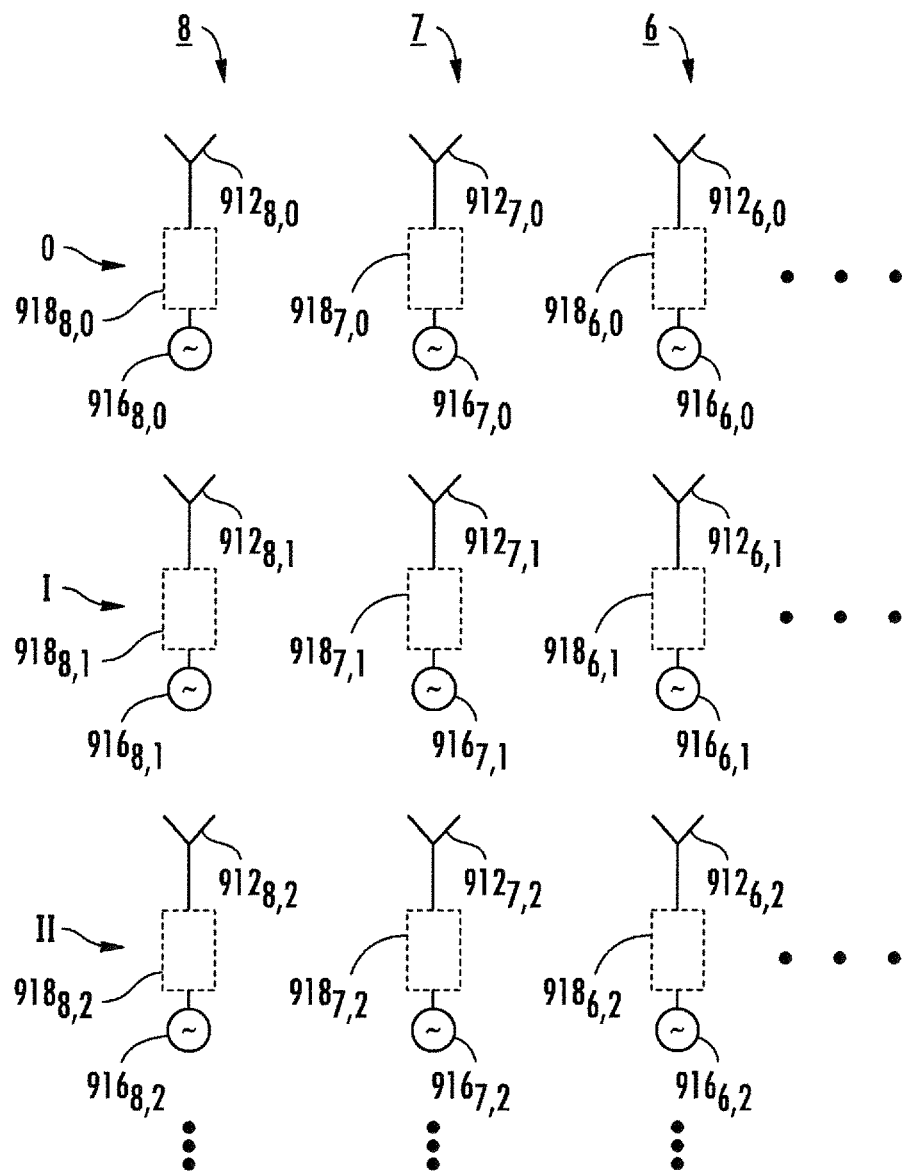
FIG. 9C is a more detailed view of a subarray portion of the planar array of FIG. 9A.

FIG. 9C is a more detailed representation of subarray portion 901 of FIG. 9A. In FIG. 9C, elements corresponding to those of FIG. 9A are designated by the same alphanumerics. In FIG. 9C, antenna element $912_{6,0}$ is driven by way of a path $918_{6,0}$ from a source $916_{6,0}$, antenna element $912_{6,1}$ is driven by way of a path $918_{6,1}$ from a source $916_{6,1}$, antenna element $912_{6,2}$ is driven by way of a path $918_{6,2}$ from a source $916_{6,2}$, antenna element $912_{7,0}$ is driven by way of a path $918_{7,0}$ from a source $916_{7,0}$, antenna element $912_{7,1}$ is driven by way of a path $918_{7,1}$ from a source $916_{7,1}$, antenna element $912_{7,2}$ is driven by way of a path $918_{7,2}$ from a source $916_{7,2}$, antenna element $912_{8,0}$ is driven by way of a path $918_{8,0}$ from a source $916_{8,0}$, antenna element $912_{8,1}$ is driven by way of a path $918_{8,1}$ from a source $916_{8,1}$, and antenna element $912_{8,2}$ is driven by way of a path $918_{8,2}$ from a source $916_{8,2}$.

Figure 10A:
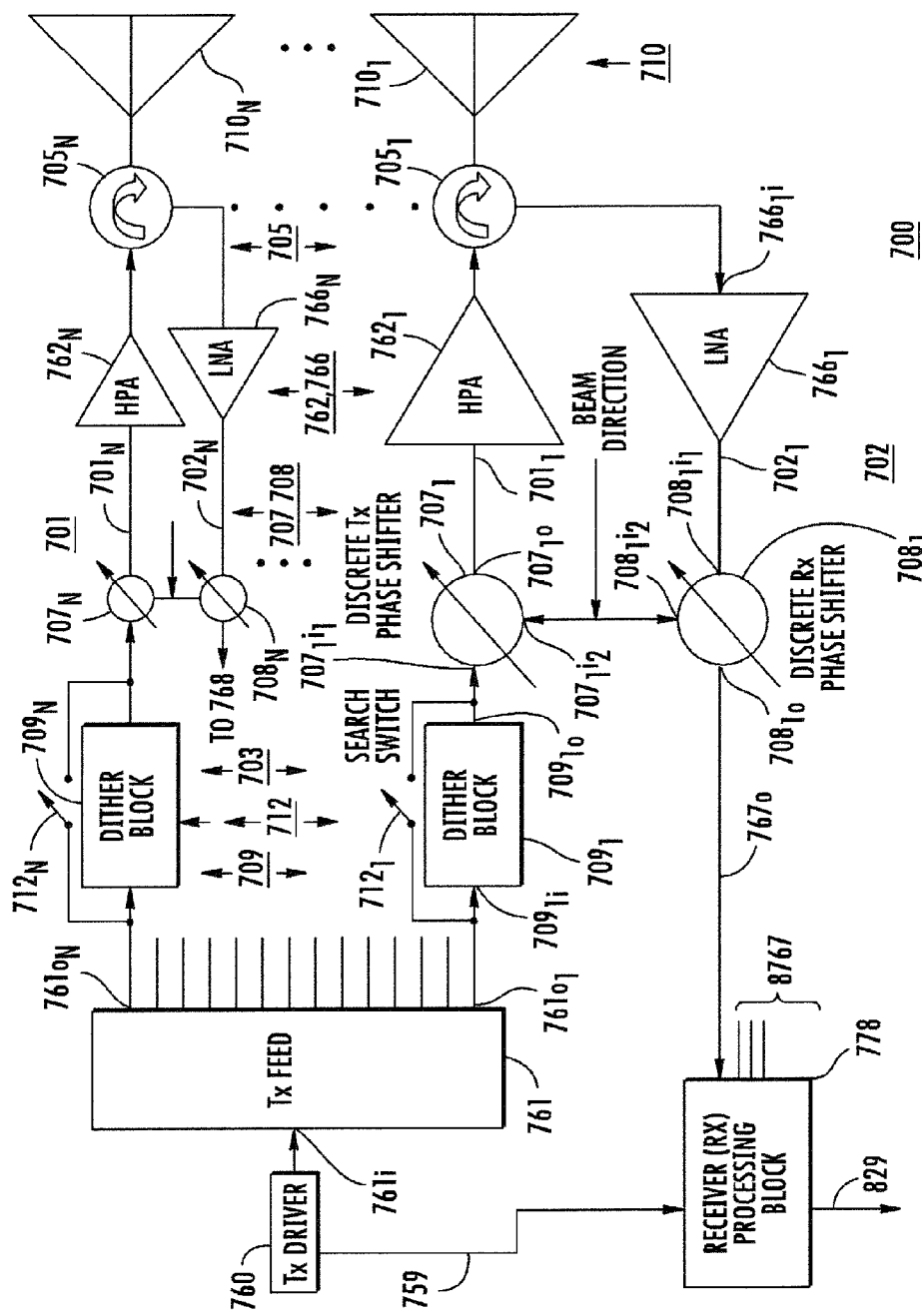
FIG. 10A is a simplified block diagram of a radar system with a frequency dither function on both transmit and receive in accordance with an aspect of the disclosure, including a receiver and computer processing function.

FIG. 10A is a simplified block diagram of an embodiment of a radar system 700 using aspects of the disclosure to steer the transmit and receive beams. Those skilled in the art will understand that the principles are applicable to sonar and lidar. In FIG. 10A, a transmit portion of the radar system is designated generally as 701. Transmit portion 701 includes driver 760, feed 761, dither blocks of set 709, phase shifters of set 707, amplifiers of set 762, and portions of transmit-receive devices of set 705. The receive portion of radar system 700 is designated 702. Receive portion 702 includes portions of transmit-receive devices of set 705, amplifiers of set 766, phase shifters of set 708, and processing block 778. In FIG. 10A, the common RF pulse is generated by a transmit (Tx) Driver 760. For the sake of simplicity it is assumed that the RF pulse is a fixed-frequency pulse of constant amplitude. The RF pulse is applied to an input port $761i$ of a beamformer (Tx Feed or power divider) 761. Each output port $761o_1$-$761o_N$ of Tx Feed 761 is ultimately coupled by either a direct (no intervening elements) or indirect (by way of intervening elements) path to a radiating antenna element of set 710 of N radiating elements, two of which elements are illustrated as $710_1$ and $710_N$. Those skilled in the art will recognize that antenna array 710 corresponds to the arrays and subarrays of FIGS. 6A through 6F. The path from each output port of Tx Feed 761 to the corresponding antenna element of set 710 of antenna elements extends through a dither block of a set 709 of dither blocks and a phase shifter block of a set 707 of phase shifter blocks, through a power amplifying block of set 762 of high power amplifiers (HPA) and a circulator block of a set 705 of circulators. As an example of the flow of signal from an output port of Tx Feed 761 to an antenna element, signal from output port $761o_1$ of Tx Feed 761 flows to an input port $709_{1i}$ of dither block $709_1$ of set 709 of dither blocks. Dither block $709_1$ is conceptually bypassed by a controllable switch illustrated as a mechanical "search" switch $712_1$ of a set 712 of switches. Those skilled in the art understand that such a mechanical representation is solely for purposes of ease of explanation, and that electronic switches are ordinarily used for such functions. If the bypass switch $712_1$ is "nonconductive" or in the "open" condition, the signal from output port $761o_1$ of Tx Feed 761 flows to input port $709_{1i}$, $709_{1i}$ of dither block $709_1$. Dither block $709_1$ generates signals with zero frequency offset at its output port $709_1o$, and the frequency offset progressively increases from antenna element $710_1$ to $710_N$ by the increment defined in equation (4). The dithered signals at output port $709_1o$ of dither block $709_1$ are applied to an input port $707_1I_1$ of a discrete transmit-beam (Tx) phase shifter $707_1$ of set 707 of transmit-beam phase shifters, which phase shifters of set 707 are controlled on transmit by antenna beam direction control signals from a radar control computer (not illustrated); it should be understood that two factors affect the transmit beam direction, namely the overall beam direction as established by phase shifter $707_1$ and other corresponding phase shifters, and the multiple dither frequencies, which cause the beam rotation relative to the overall beam direction. The dithered antenna-beam-direction-controlled signals at the output port $707_1 o$ of phase shifter $707_1$ are applied to a high-power amplifier (HPA) $762_1$ for amplification, and thence by way of a transmit-receive device illustrated as a circulator $705_1$ (of a set 705 of transmit-receive devices) to antenna element $710_1$ of set 710 of antenna elements. This arrangement applies each of the dithered signals to be transmitted through (by way of) one of the antenna element of the antenna array 710. All the signals originating from the various dither blocks of set 709 of dither blocks and transmitted by radiating antenna elements of set 710 with progressive dual frequency offset, and combine in space to form the desired two transmit beams moving with time in mutually opposite directions in space. If the antenna array 710 is a line array, the beam structure is ordinarily understood to be defined in a plane which includes the array, and the steering of the two beams occurs in such a plane, as illustrated in FIG. 6C. Basically, the dither blocks of set 709 perform the functions described in conjunction with sources of set 626 of FIG. 6D.

Return radar signals from the target(s) are received by antenna set 710 of FIG. 10A. In general, the signals received by each antenna element of set 710 are coupled through the transmit-receive device (in this case a circulator of set 705) to a low-noise amplifier (LNA) of a set 766 of low-noise amplifiers, and through a further discrete receive-beam phase shifter of a set 708 of receive phase shifters to a port of a receive beamformer or combiner. More particularly, reflected signal from a target or targets and received by antenna element $710_1$ of array antenna 710 is coupled through circulator $705_1$ to an input port $766_{1i}$ $766_1 i_1$ of low-noise amplifier $766_1$, and the amplified received signal is applied to a first input port $708_1 i_1$ of a discrete receive-beam (Rx) phase shifter $708_1$ and flows to a port of a receive (RX) block 778 $778_{i1}$. The beam direction which is controlled in part by receive phase shifter $708_1$ is synchronized with the beam direction of the transmit beam by application to its second input port $708_1 i_2$ of the same antenna beam direction signals that are applied to transmit phase shifter $707_1$. The phase-shifted receive signal from Rx phase shifter $708_1$ and other receive phase shifters of set 708 of receive phase shifters are applied individually to input ports of a set 8767 of input ports of a Receive (Rx) processing block 778. Details of receive processing block 778 are illustrated in conjunction with FIG. 11. The processed signals on path 829 from block 778 of FIG. 10A represent the target direction-of-arrival information.

During operation of the arrangement of FIG. 10A for volume search of a known type, all the switches of set 712 of switches can be set to the ON position (the position of switch 712 other than that illustrated) and the dither function is effectively suppressed or immobilized, so that the radar system operates in the prior-art manner. When a target or group of targets is detected through this search, the operating state of the arrangement of FIG. 10A is switched for "within pulse search," which is styled ultra fast "within pulse search" because of the scanning advantage arising from operation according to an aspect of the disclosure. Alternatively, with high signal-to-noise ratio, the "within-pulse-search" mode may also used for basic search. In the "within pulse search" mode all the switches of set 703 of switches are in their OFF or nonconductive condition, thereby allowing the dither blocks of set 709 to function.

Figure 10B:
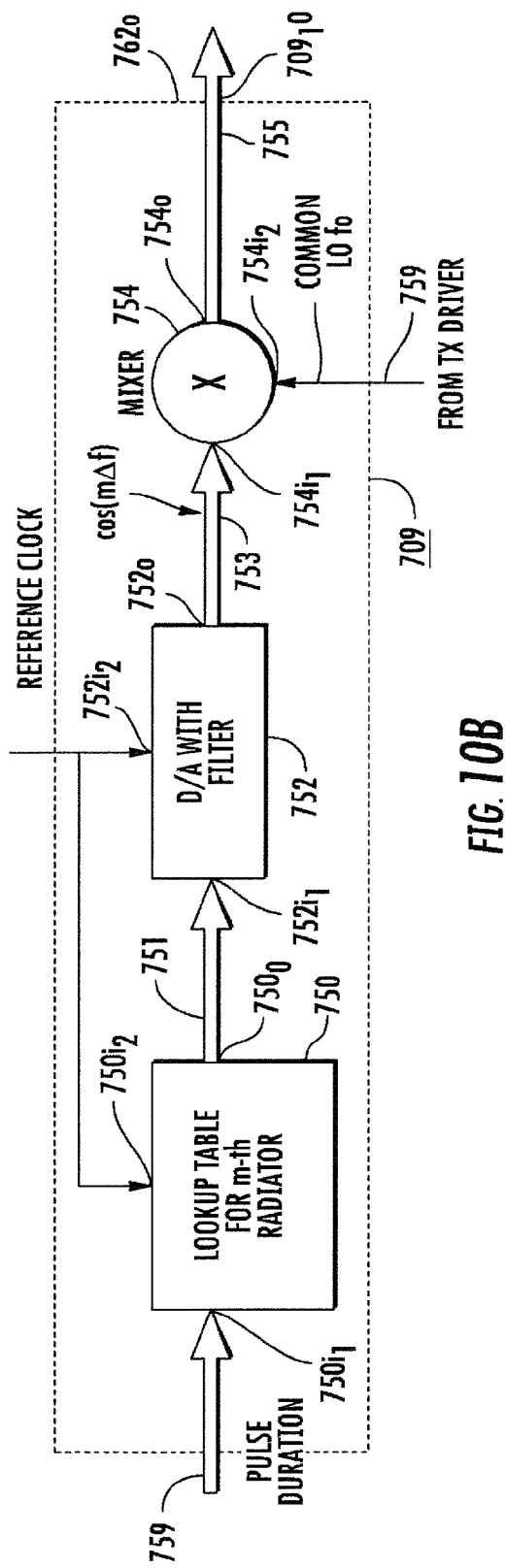
FIG. 10B is a simplified block diagram of a frequency dither portion of FIG. 10A in accordance with an aspect of the disclosure.

A representative dither block $709_m$ of set 709 of dither blocks of FIG. 10A is illustrated in further detail in the block diagram of FIG. 10B. In FIG. 10B, dither block $709_m$ includes a block 750 including a digital processor with a memory for a lookup table. Lookup table 750 stores two numbers at each memory address, namely the antenna element number m and the number N of elements in the array row. Lookup table 750 is addressed at an input port $750 i_1$ by digital signals from Tx driver 760 of FIG. 10A, carrying information about the pulse duration and current frequency offset. Simultaneously, block 750 receives reference clock signal at a port $750 i_2$ synchronizing all operation in dither blocks 709. The digital processor in block 750 provides the computation of time-domain function $$\cos\left(\frac{2.76}{N-1}T\right), T = mt/\tau \quad (7)$$
$$0 \le m \le N-1$$

where:
T is a time variable ranging from 0 to m; and
τ is defined by equation (5).

Digital processor 750 sends data from an output port $750 o$ by way of a path 751 to an input port $752 i_1$ of "D/A with filter" block 752. The reference clock is applied to an input port $752 i_2$ of D/A with filter block 752. Block 752 represents the combination of a digital-to-analog converter (DAC or D/A) and analog low pass filter. The digital signal applied from output port $750 o$ of block 750 is converted to analog form in the DAC function of block 752, and the filter function smoothes the resulting analog signal appearing at output port $752 o$ of block 752. Those skilled in the art will understand that all parts in FIG. 10B can be digitized.

The analog or digital signal cos (2πmΔft) appearing at output port $752 o$ of block 752 of FIG. 10B is applied by way of a path 753 to a first input port $754 i_1$ of a balanced mixer (X) 754. Mixer 754 also receives a common local oscillator (LO) signal at frequency f0 at its second input port $754 i_2$. Mixer 754 mixes or multiplies the signals in known fashion, and produces at its mixer output port $754 o$ a signal dithered about the center frequency f0. The mixer output signal $$\cos(2\pi f_0 t)\cos(2\pi m \Delta f t) = 2(\cos(2\pi (f_0 + m \Delta f)t) + \cos(2\pi (f_0 - m \Delta f)t)) \quad (8)$$

is exactly the one required for the dither steering, and is applied by way of output port $709_1 o$ to the transmitter phase shifter $707_1$.

Figure 11:
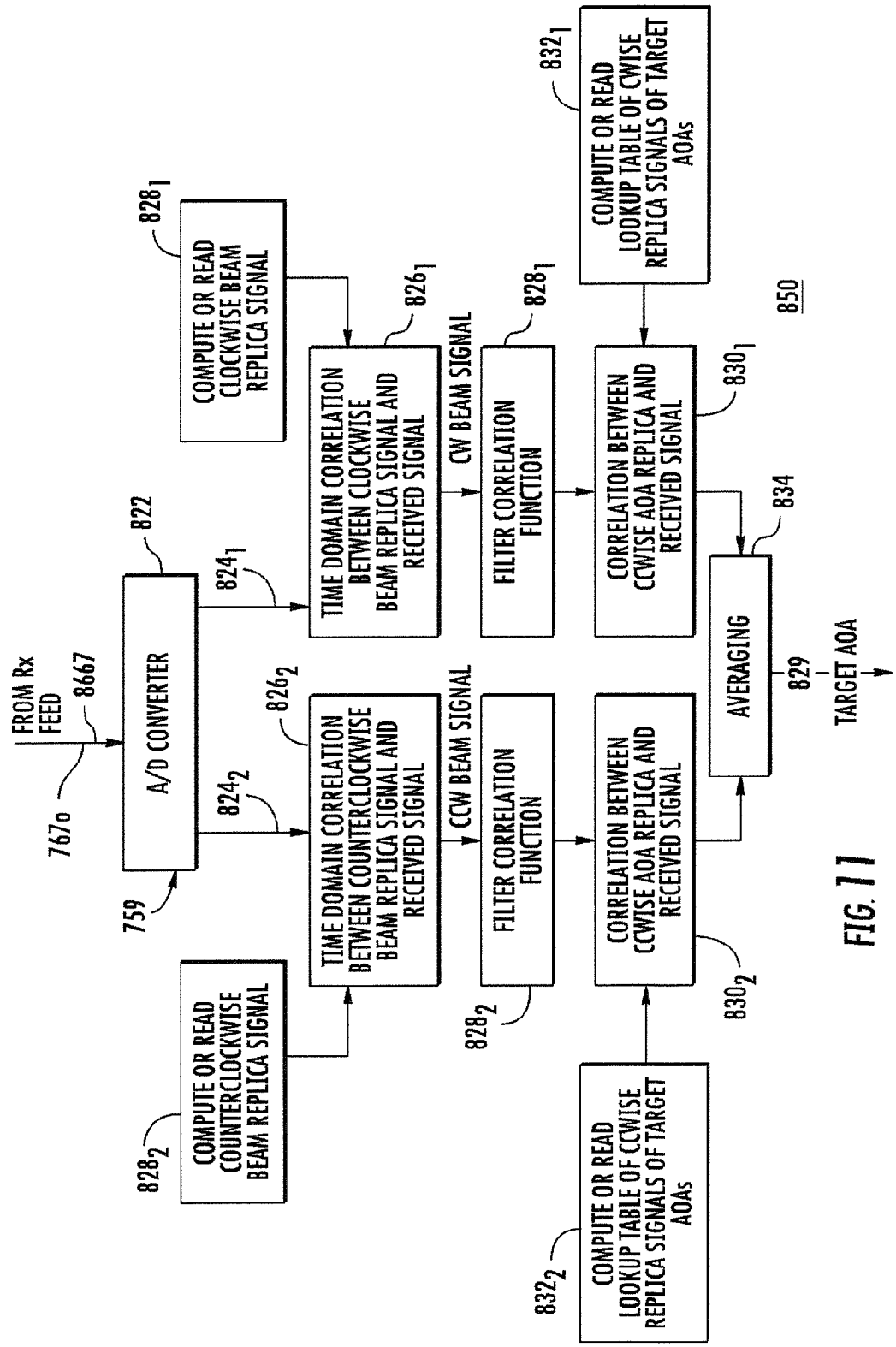
FIG. 11 is a simplified control or logic flow chart or diagram of a digital receiver and computer processing of FIG. 10A in accordance with an aspect of the disclosure.

FIG. 11 is a simplified block diagram illustrating the receive signal processing 778 associated with the dither-on-transmit, dither-on-receive receive arrangement 700 of FIG. 10A. In FIG. 11, one of the receive feed signals on path $767 o$ is applied to a baseband downconverter and A/D converter represented as a block 822. After baseband downconverter and A/D converter 822, superposed digital clockwise and counterclockwise received voltages on paths $824_1$ and $824_2$ are applied to time-domain correlation blocks $826_1$ and $826_2$, respectively, for comparing or correlating precomputed clockwise and counterclockwise beam replicas from blocks $828_1$ and $828_2$, respectively, with the measured superposition of clockwise (CWise or CW) and counterclockwise (CCWise or CCW) beams. The correlated output of block $826_1$ represents the CW beam signal, and the correlated output of block $826_2$ represents the CCW beam signal. The outputs of blocks $826_1$ and $826_2$ are applied to filtering blocks $828_1$ and $828_2$, respectively, to form the voltage signal scattered from target(s) by each of the CW and COW beams. According to the equation (4) each of these beam voltages carries the unique information about the target angle of arrival (AOA). The next step of signal processing in FIG. 11 is the estimation of this AOA. In order to produce this unique information, a second stage of correlation is performed. The filtered outputs are applied from blocks $828_1$ and $828_2$ by way of paths $828a$ and $828b$, respectively, to further correlation blocks $830_1$ and $830_2$. Simultaneously the reference signals to the blocks $830_1$ and $830_2$ come from the storage lookup table blocks $832_1$ and $832_2$ for comparison and pattern recognition. The same blocks $830_1$ and $830_2$ provide the calculation of distances between the images of the replica signals and the received signal. The minimum of this distance corresponds to a target AOA. The averaging in the block 834 produces the value of the minimum and improves the accuracy of the AOA estimation. The output signal on path 829 represents the maximum likelihood direction of the target angle of arrival. Time-domain computer simulation has shown that a MiniMax (minimum distance between maximum correlation signals) leads to extremely high angle-of-arrival (AOA) estimation accuracy. Anyone skilled in art can replace the time-domain processing with frequency-domain processing.

The arrangements associated with FIGS. 10A, 10B, and 11 are described as scanning both the transmit and receive beams. According to another aspect of the disclosure described in conjunction with FIGS. 12A, 12B, and 12C, during volume search, a single un-scanned or not-scanned narrow "flood" transmit beam looking at, or illuminating, all targets within its beamwidth (BW) may be used, and the receive beams may synthetically be "rotatably scanned" according to aspects of the disclosure. A digital receiver array antenna provides the multiple "within-pulse" scanning of the receive beams, with the receive beams sampling the space illuminated by the transmit array antenna, followed by subsequent signal processing.

Figure 12A:
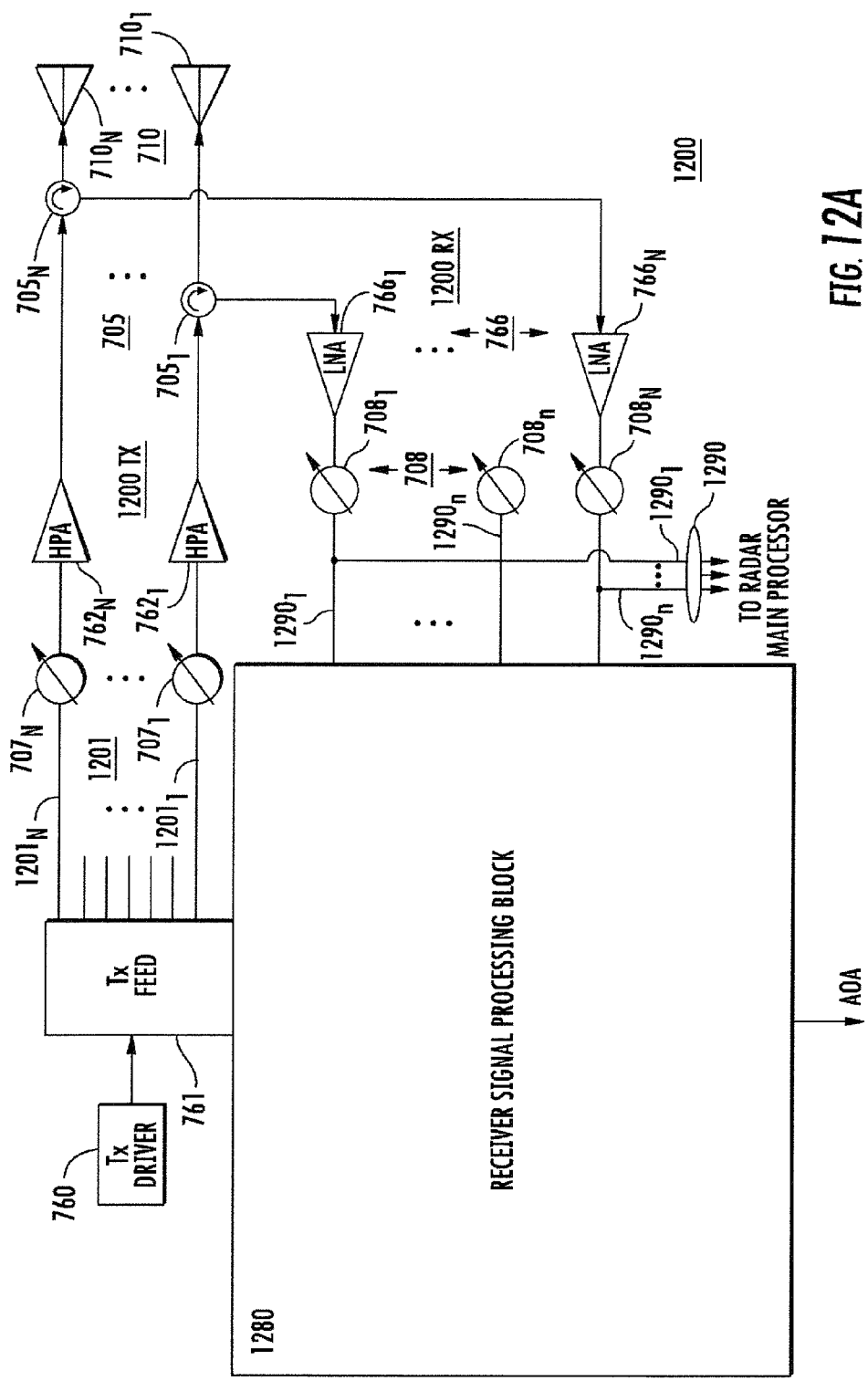
FIG. 12A is a simplified block diagram of a radar system with dither of the beams only on receive.

An embodiment of the present disclosure which applies dither technique through receiver signal processing is illustrated by the simplified radar block diagram 1200 of FIG. 12A. Radar 1200 of FIG. 12A is generally similar to radar 700 of FIG. 10A, and corresponding elements are designated by the same reference alphanumerics. Radar 1200 of FIG. 12A includes a transmit portion 1200TX and a receive portion 1200RX, and also includes portions such as the circulator array 705 and the antenna array 710 which are common to both transmit and receive functions. In the transmit portion 1200TX, the dither block(s) 762 of FIG. 10A is/are replaced by a simple set of paths 1201, such as paths $1201_1$ and $1201_N$ extending from TX Feed block 761 to transmit beam direction phase shifters $707_1$ and $707_N$, so that dither of the flood beam is not used on transmit. The receive portion 1200RX of radar 1200 of FIG. 12A produces low-noise-amplified and direction-phase-shifted received signals on a set 1290 of signal paths, which signals are applied to receiver signal processing block 1280 presented in more details in FIG. 12B.

In FIG. 12A, the transmit part of the radar architecture does not cause transmit beam rotation, thereby creating or establishing a not-moving or motionless and directed to detected by radar in search regime target position transmit beam during the pulse duration. The signal returned from the target arrives at array element $710_1$ of FIG. 12A, and goes through a circulator $705_1$ of set 705 of circulators, which channelizes this signal to low-noise amplifier (LNA) $766_1$ of a set 766 of low-noise amplifiers for low-noise amplification. A discrete phase shifter $708_1$ of set 708 of phase shifters aids in setting the general direction of the receive beam to coincide with the direction of the peak of the transmit beam. Then the received signal is divided such that part its energy goes by way of a set of paths 1290 to a Radar Main Processor (not illustrated in FIG. 12A) to estimate range, Doppler, etc. The remaining energy is brought to receiver signal processing block 1280 consisting of multiple digital processing circuits similar to shown in FIG. 12B.

Figure 12B:
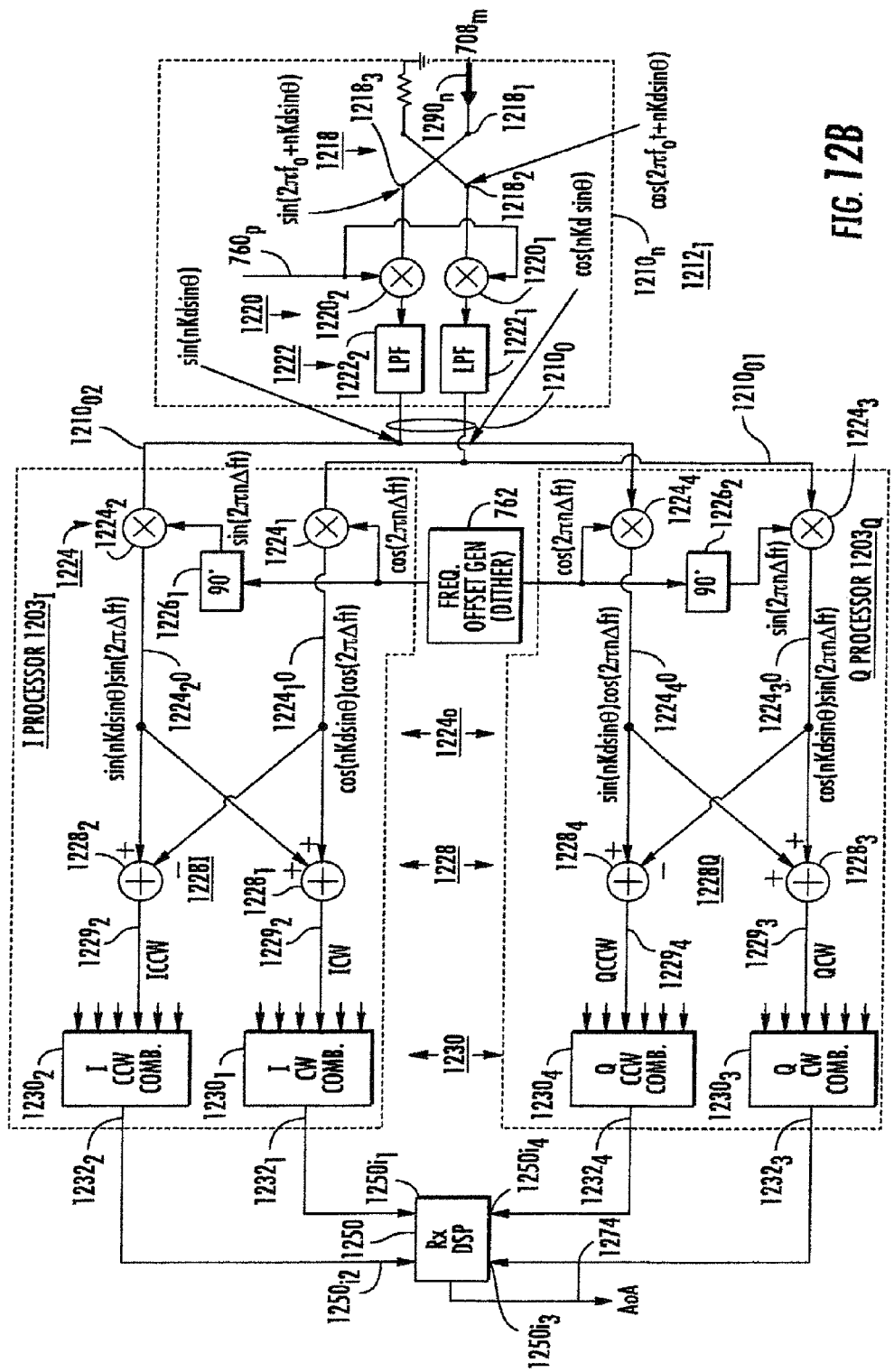
FIG. 12B illustrates details of a portion of the radar of FIG. 12A.

FIG. 12B is a simplified schematic and block diagram illustrating some details of FIG. 12A. For the sake of simplicity, the signal processing in FIG. 12B is illustrated with analog devices. Any knowledgeable in signal processing technique can understand that any part or the whole block 1280 can be replaced by digital processor putting A/D converters in each path $1290_n$ in front of block 1210, or within block 1210 after the mixers (x) 1212, or in any other part of block 1280. Elements of FIG. 12B corresponding to those of FIG. 12A are designated by the same alphanumerics; the illustrated channel of FIG. 12B corresponds to signal received from an antenna element $710n$ of FIG. 12A. In FIG. 12B, downconverter $1210n$ includes 3 dB 90-degrees power divider 1218, set of two mixers 1220 and set of two filter blocks 1222. In FIG. 12B, the receive-beam-direction phase-shifted output from phase shifter 708, (FIG. 12A) is applied by way of a path $1290n$ to an input port $1218_1$ of a hybrid 1218 which includes a 0° output port $1218_2$ and a 90° output port $1218_3$. The 0° and 90° outputs of hybrid 1218 are coupled to mixers $1220_1$ and $1220_2$, for converting the received RF to baseband. The baseband analog or digital signal cos(nkd sin θ)+cos(4π$f_0$t+nkd sin θ) from mixer $1220_1$ is applied to a first analog or digital low-pass filter (LPF) $1222_1$, and the baseband analog or digital signal sin(nkd sin θ)+sin(4π$f_0$t+nkd sin θ) from mixer $1220_2$ is applied to a second low-pass filter $1222_2$. The filtered baseband signals from filters $1222_1$ and $1222_2$ are applied by way of paths $1210o_1$ and $1202o_2$, respectively, designated together as $1210o$, to I- and Q-processors 1203Q and 1203I, respectively.

More particularly, the signals on paths $1210o1$ and $1202o2$ of FIG. 12B are applied in I processor 1203I to multipliers $1224_1$ and $1224_2$, respectively, of a set of multipliers 1224, for multiplication by the dither frequency offset (the dither offset frequency) signal cos(2πnΔft) associated with the specific $n^{th}$ antenna array element. The dither frequency offset signal cos(2πnΔft) is illustrated as being generated by a block 762, and sin(2πnΔft) is generated by 90° phase shifters $1226_1$ and $1226_2$. More particularly, multiplier $1224_1$ multiplies the low-pass filtered signal from LPF $1222_1$ by cos(2πnΔft), and multiplier $1224_2$ multiplies the low-pass filtered signal from LPF $1222_2$ by sin(2πnΔft). This creates modified receive signals cos(nKd sin θ)cos(2πΔft) and sin(nKd sin θ)sin(2πΔft) on multiplier output paths $1224_1o$ and $1224_2o$, respectively. These modified receive signals are applied to a summing arrangement 1228, which includes a summing adder $1228_1$ and a differencing adder $1228_2$. The output of the summing adder $1228_1$ on path $1229_1$ is the I (inphase)-component of the clockwise (CW) beam for the antenna element in question, and the output of differencing adder $1228_2$ on path $1229_2$ is the I-component of the counterclockwise (CCW) beam. The summed I-components of clockwise and counterclockwise signals produced by summing arrangement 1228 are applied, together with other summed I-component signals originating from other antenna elements, to combiners of a set 1230 of combiners. More particularly, the I-component of CW beam signal originating from the $n^{th}$ antenna element in question is applied from summing adder $1228_1$ by way of a path $1229_1$ to an input port of I-component clockwise beam combiner $1230_1$ of set 1230 of combiners, and the I-component of CCW beam signal is applied from differencing adder $1228_2$ by way of a path $1229_2$ to an input port of I-component counterclockwise beam combiner $1230_2$.

Also in FIG. 12B, the signals on paths $1210o1$ and $1202o2$ are applied in Q processor 1203Q to multipliers $1224_3$ and $1224_4$, respectively, of set 1224 of multipliers, for multiplication by the dither frequency offset (the dither offset frequency) signal cos(2πnΔft) associated with the specific $n^{th}$ antenna array element. The dither frequency offset signal cos(2πnΔft) generated by block 762 is converted to sin (2πnΔft) by 90° phase shifter block 1226₂. More particularly, multiplier 1224₃ multiplies the low-pass filtered signal from LPF 1222₁ by sin(2πnΔft), and multiplier 1224₄ multiplies the low-pass filtered signal from LPF 1222₂ by cos(2πnΔft). This creates modified receive signals cos(nKd sin θ)cos (2πΔft) and sin(nKd sin θ)sin(2πΔft) on multiplier output paths 1224₃o and 1224₄o, respectively. These modified receive signals are applied to portions 1228Q of summing arrangement 1228, which includes a summing adder 1228₃ and a differencing adder 1228₄. The output of summing adder 1228₃ on path 1229₃ is the Q (quadrature-phase)-component of the clockwise (CW) beam for the antenna element in question, and the output of differencing adder 1228₄ on path 1229₄ is the Q-component of the counterclockwise (CCW) beam. The summed Q-components of clockwise and counterclockwise signals produced by summing arrangement 1228Q are applied, together with other summed Q-component signals originating from other antenna elements, to combiners 1230₃ and 1230₄ of a set 1230 of combiners. More particularly, the Q-component of the CW beam signal from the antenna element in question is applied from summing adder 1228₃ by way of a path 1229₃ to an input port of Q-component clockwise (QCW) beam combiner 1230₃ of set 1230 of combiners, and the Q-component of the CCW beam signal is applied from differencing adder 1228₄ by way of a path 1229₄ to an input port of Q-component counterclockwise (QCCW) beam combiner 1230₄.

Thus, the summed I-component from clockwise beam combiner 1230₁ and from counterclockwise beam combiner 1230₂ of FIG. 12B combine the I-component of CW and CCW beams originating from all of the antenna elements to produce summed or combined I-component of CW and CCW beam signals at their output ports 1232₁ and 1232₂, respectively. More particularly, the combined CW I beam produced by summing adder 1230₁ is applied by way of a path 1232₁ to a first input port 1250i1 of a receive (RX) digital signal processor (DSP) 1250, and the combined CCW I beam produced by differencing adder 1230₂ is applied by way of a path 1232₂ to a second input port 1250i2 of receive digital signal processor 1250. Also, the clockwise beam combiner 1230₃ and counterclockwise beam combiner 1230₄ combine the Q-component of CW and CCW beams originating from all of the antenna elements to produce summed or combined Q-component of CW and CCW beam signals at their output ports 1232₃ and 1232₄, respectively. More particularly, the combined Q CCW beam produced by summing adder 1230₃ is applied by way of a path 1232₃ to a third input port 1250i3 of receive (RX) digital signal processor (RX DSP) 1250, and the combined Q CCW beam produced by differencing adder 1230₄ is applied by way of a path 1232₄ to a fourth input port 1250i4 of receive digital signal processor 1250.

Figure 12C:
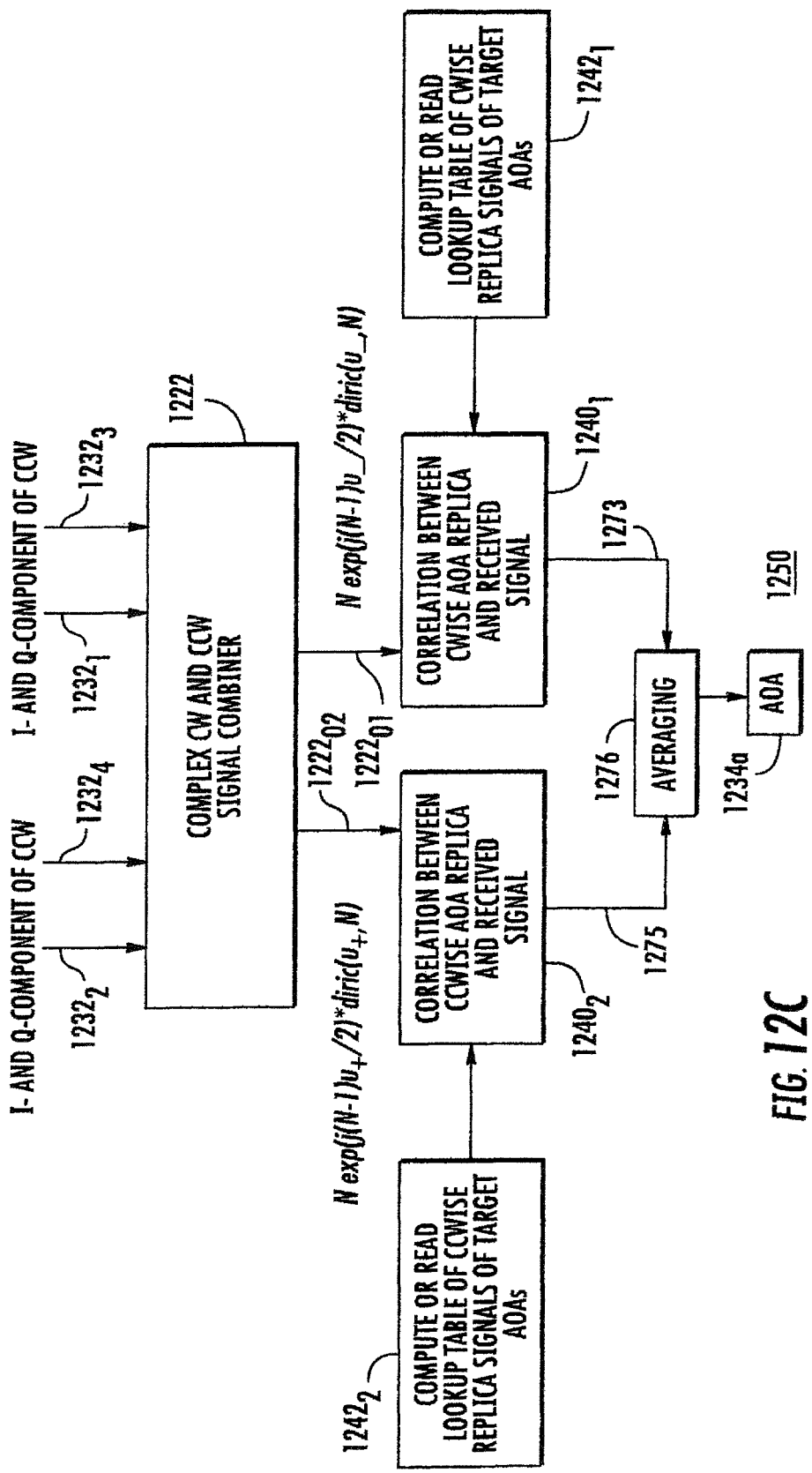
FIG. 12C is a computer logic or control flow chart or diagram illustrating operation of a portion of the radar of FIG. 12B.

FIG. 12C is a simplified control or logic flow chart or diagram of receive (Rx) digital signal processor corresponding to RX DSP block 1250 of FIG. 12B. In FIG. 12C, the I component of the CW signal is applied by way of path 1232₁ to a Complex CW and CCW signal combiner illustrated as a block 1222. Also, the I component of the CCW signal is applied to combiner 1222 by way of path 1232₂, the Q component of the CW signal is applied by way of path 1232₃, and the Q component of the COW signal is applied by way of path 1232₄. Block 1222 combines I- and Q-components of CW and CCW beam signal, which are corrupted by noise, into complex voltages according to equation (4). The CW beam complex signal from combiner 1222 is applied by way of combiner output path 1222o₁ to a CW correlator illustrated as a block 1240₁, and the COW beam signal is applied by way of path 1222o₂ to a CCW correlator illustrated as a block 1240₂. Each of the correlator blocks 1240₂ and 1240₂ receives reference data representing the idealized receive beam, which is to say without noise, from sources illustrated as blocks of set 1242. More particularly, CW correlator block 1240₁ receives CW beam replica information from a block 1242₁, and CCW correlator block 1240₂ receives CCW beam replica information from a block 1242₂. The replica or reference information may be calculated afresh each time, or may be read from a lookup table. The correlated output signals of blocks 1240₁ and 1240₂ represent I and Q components of the combined signal. The outputs of correlator blocks 1240₁ and 1240₂ each represent time/frequency domain profiles with particular shape corresponding to the target's location relative to the peak of the transmit beam. The final stage of signal processing is objective function forming, which is performed in averaging block 1276. The signals from correlation blocks 1240₁ and 1240₂ are applied by way of paths 1273 and 1275, respectively, to averaging block 1276. The signals on path 1273 and 1275 together constitute a single complex voltage representing the target angle of arrival.

The process performed in block 1276 can be mathematically described as $$\text{Signal}_{1234a} = \sum_{i=1}^{n} \alpha \text{Signal}_{1273} + \beta \text{Signal}_{1275}$$

where:

α and β are constants whose values depend upon the particular array geometry; and n is the number of digital samples available during one pulse duration.

Signal$_{1234a}$ on path 1234a of FIG. 12C represents the maximum likelihood direction of the target angle of arrival or angle of arrival (AOA). Time- and frequency-domain computer simulation showed that a MiniMax (smallest maximum deviation) procedure applied to product of sum of Q-components and difference of I-components leads to extremely high angle-of-arrival (AOA) estimation gain.

It will be apparent to those skilled in the art that the direction-of-arrival (DOA) signal on path 1234a represents a single included angle of arrival of a target with respect to the array plane.

FIG. 13 tabulates the results of numerical simulation of dither technique AOA accuracy in comparison with monopulse radar. According to this data the dither technique allows reaching much higher angular accuracy than similar monopulse radar. Those having ordinary skill in the art and access to the teachings provided herein will recognize the possibility of use of as many tones or dither frequencies as may be desired, thereby simultaneously creating multiple overlapping and mutually contrarotating beams to improve angular accuracy. Additionally, multiple different dither frequencies can be used to avoid beam orientations at which a jammer is known or expected to exist.

Those having ordinary skill in the art and access to the teachings provided herein will recognize that since dither technique allows to get much higher angular accuracy than monopulse radar the same conclusion is correct for angular resolution letting resolve more than one target within beamwidth.

A method (1200) for locating a target according to an aspect of the disclosure comprises the steps of receiving RF signals from a target at each element of an antenna array (700), and dividing ($1210_{o1}$, $1210_{o2}$) the RF signal power from each element into equal portions, to thereby generate a plurality of divided signals for each antenna element. Mutually frequency-offset multiplication signals are generated (1212), and each of the divided signals is modulated (1210) by one of the multiplication signals, so as to thereby generate positive and negative frequency offset received signals (at the outputs of multipliers $1224_1$, $1224_2$, $1224_3$, $1224_4$). All of the negative frequency offset received signals (CW signals) from all of the antenna elements are combined ($1232_1$, $1232_2$, $1232_3$, $1232_4$1321, 12322, 12323, 12324) to thereby generate CW received beam signals, and all of the positive frequency offset received signals from all of the antenna elements are combined to thereby generate CCW received beam signals. In a particular mode, the method further comprises the steps of generating complex CW and CCW signals from the received beam signals, and generating replica signals which represent a plurality of targets at different angles of arrival. The received CW and CCW beam signals are correlated with the replica signals, to thereby generate correlated signals. The angle of arrival of signal from the target is deemed to equal the angle of the maximum value of correlation. In a particular mode of the method, the step of receiving RF signals from a target at each element of an antenna array comprises the step of receiving RF signals reflected from a target at each element of an antenna array.

An apparatus (1200) for locating a target comprises an antenna array (700) for receiving RF signals from a target at each element to thereby generate RF signal power from each element comprises a divider arrangement for dividing the RF signal power from each element into equal portions, to thereby generate a plurality of divided signals for each antenna element, and a source (1212) of mutually frequency-offset multiplication signals. A modulator (1210) is provided for modulating each of the divided signals by one of the multiplication signals, so as to thereby generate positive- and negative-frequency offset received signals. A first combiner combines all of the negative frequency offset received signals from all of the antenna elements to thereby generate CW received beam signals, and a second combiner combines all of the positive frequency offset received signals from all of the antenna elements to thereby generate CCW received beam signals. A particular embodiment further comprises an I and Q complex signal generator arrangement (1222) coupled to the first and second combiners for generating complex CW and CCW signals from the received beam signals. A replica signal generating arrangement (12421, 12422) generates replica signals which represent a plurality of targets at different angles of arrival. A correlator arrangement ($1240_1$, $1240_2$12401, 12402) is coupled to the replica signal generator arrangement ($1242_1$, $1242_2$12421, 12422) and to the complex signal generator arrangement (1222), for correlating the received CW and CCW beam signals with the replica signals, to thereby generate correlated signals. A processor (1276) is coupled to receive the correlated signals for deeming the angle of arrival of signal from the target to equal the angle of the maximum value of correlation. A further embodiment comprises a transmitter (701) for transmitting electromagnetic signals toward the target for generating return RF signals for reception by the elements of the antenna array (700).

An electromagnetic transmitter arrangement (600) according to an aspect of the disclosure comprises one of an antenna line array (612) and subarray (613). The one of the line array (612) and subarray (613) defines at least first (left) and second (right) ends. The one of the line array (612) and subarray (613) includes at least first ($612_0$), second ($612_1$), third ($612_2$), fourth ($612_3$), and fifth ($612_4$) antenna elements, with the first antenna element ($612_0$) at the first (left) end of the one of the line array (612) and subarray (613), the fifth antenna element ($612_4$) at the second (right) end of the one of the line array (612) and subarray (613), the third antenna element ($612_2$) at the center of the one of the line array (612) and subarray (613), the second antenna element ($612_1$) lying between the first ($612_0$) and third ($612_2$) antenna elements, and the fourth antenna element ($612_3$) lying between the third ($612_2$) and fifth ($612_4$) antenna elements. First ($616_0$), second ($616_1$), third ($616_2$), fourth ($616_3$), and fifth ($616_4$) radio-frequency signal sources are provided. The first signal source ($616_0$) generates signals at frequency of (f0), the second signal source ($616_1$) generates frequencies of (f0)±Δf, where the symbol ± means "plus and minus." The third signal source ($616_2$) generates frequencies of (f0)±2Δf, the fourth signal source ($616_3$) generates frequencies of (f0)±3Δf, and the fifth signal source ($616_4$) generates frequencies of (f0)±4Δf. A first radio-frequency signal path (618a) extends from the first signal source ($616_0$) to the first antenna element ($612_0$), a second radio-frequency signal path (618b) extends from the second signal source ($616_1$) to the second antenna element ($612_1$), a third radio-frequency signal path (618c) extends from the third signal source ($616_2$) to the third antenna element ($612_2$), a fourth radio-frequency signal path (618d) extends from the fourth signal source ($616_3$) to the fourth antenna element ($612_3$), and a fifth radio-frequency signal path (618e) extends from the fifth signal source ($616_4$) to the fifth antenna element ($612_4$). In a particular embodiment of the electromagnetic transmitter arrangement, the one of an antenna line array (612) and subarray (613) is part of a planar array (900). In another particular embodiment, each of the first (618a), second (618b), third (618c), fourth (618d), and fifth (618e) radio-frequency signal paths includes one of a phase shifter ($607_1$ etc) and a time-delay element. In yet another particular embodiment, each of the first (618a), second (618b), third (618c), fourth (618d), and fifth (618e) radio-frequency signal paths includes at least one of a phase shifter (707), an amplifier (762), and a circulator (705). In a further embodiment, the first ($616_0$), second ($616_1$), third ($616_2$), fourth ($616_3$), and fifth ($616_4$) radio-frequency signal sources transmit their respective signals in a synchronized manner (by 761).

A radar system (700; 850) for locating a target with an Active Electronically Scanning Array (AESA) (900) transmitting simultaneously at least, or as minimum, two steered-continuously-in-time and in opposite direction beams (clockwise and counterclockwise beams) and consisting of plurality of linear arrays, where each linear array (710) comprises one of a plurality of single radiators (612), a plurality of subarrays (799), and a plurality of overlapped subarrays (800). An embodiment of this radar system with an AESA (900) comprises a plurality of linear arrays, each the linear array (700) including an electromagnetic transmitter arrangement (701) and an electromagnetic receiver arrangement (702). The electromagnetic transmitter arrangement (701) comprises a first radio-frequency Tx signal of f0 path ($761_{o1}$) from Tx feed (761) extended from Tx driver (760) to a dither block ($709_1$) with search switch ($712_1$) generating zero frequency offset such as the signal on path ($709_{1o}$) has frequency f0, the signal of f0 goes through discrete Tx phase shifter $707_1$ to HPA ($762_1$), circulator ($705_1$) and radiated by an element ($710_1$) of the linear array (710); second radio-frequency Tx signal of f0 path ($761_{o2}$) from Tx feed (761) extended from Tx driver (760) to the dither block ($709_2$) with search switch ($712_2$) generating frequency offset ±Δf such as the signal on path ($709_{2o}$) has frequency f0±Δf, the signal of f0±Δf goes through discrete Tx phase shifter $707_2$ to HPA ($762_2$), circulator ($705_2$) and radiated by an element ($710_2$) of the linear array ($710$), and a Tx driver for generating a radio-frequency synchronization Tx signal of frequency f0. The electromagnetic receiver arrangement ($702$) comprises first CW and CCW radio-frequency Rx signals received by the an element ($710_1$) of the linear array ($710$) going through circulator ($705_1$), LNA ($766_1$), discrete Rx phase shifter ($708_1$) synchronized with discrete Tx phase shifter ($707_1$) through path ($707_{1o}$, $708_{1o}$), and through path ($767_{1o}$) goes to receiver Rx processing block ($778$). The electromagnetic receiver arrangement ($702$) also comprises second CW and CCW radio-frequency Rx signals received by an element ($710_2$) of the linear array ($710$) goes through circulator ($705_2$), LNA ($766_2$), discrete Rx phase shifter $708_2$ synchronized with discrete Tx phase shifter ($707_2$) through path ($707_{2o}$, $708_{2o}$), and through path ($767_{2o}$) goes to receiver Rx block ($778$). A receiver (Rx) processing block ($778$) consisting of Rx feed to the same as the Tx feed ($761$) combining all the received signals, to thereby produce the combined CW and CCW received signal on path ($767_o$) of Rx processing block ($778$; $850$). A baseband downconverter combines with A/D converter ($822$) and synchronized by reference Tx signal of frequency f0 through path ($759$). A replica generator ($828_1$) for generating replica of clockwise signal and a replica generator ($828_2$) for generating replica of counterclockwise signal produced by the sources of the electromagnetic transmitter. A first correlator ($826_1$) is coupled to receive combined CW and CCW signal through path ($824_1$) and replica CW signal coming from replica generator ($828_1$) the to thereby produce clockwise beam signals. A second correlator ($826_2$) is coupled to receive combined CW and CCW signal through path ($824_2$) and replica CCW signal coming from replica generator ($828_2$) to thereby produce counterclockwise beam signals. Filters ($828_1$; $828_2$) are coupled to receive the clockwise and counterclockwise correlated signals, for filtering the clockwise and counterclockwise correlated signals to reduce noise. The radar system also includes a precomputed lookup table ($832_1$) of plurality of clockwise signal replicas corresponding to expected CWa signals scattered by target(s) at different Angles of Arrival (AOAs) and a precomputed lookup table ($832_2$) of plurality of counterclockwise signal replicas corresponding to expected CCW signals scattered by target(s) at different AOAs. A first correlator ($830_1$) is coupled to received CW signal through path ($828_1$) and replicas of CW signal of different AOAs coming from replica generator ($832_1$) to thereby produce target AOA estimation. A second correlator ($830_2$) is coupled to received CCW signal through path ($828_2$) and replicas of CCW signal of different AOAs coming from replica generator ($832_2$) to thereby produce target AOA estimation. A processor arrangement ($834$) provides smoothing, pulse compression, MiniMax procedure or any other method to mitigate additionally signal-to-noise ratio and improve radar accuracy and resolution.

A dither block ($709$) responsive to a digital signal representing the Tx pulse duration and also responsive to a reference clock. The dither block ($709$) comprises a microprocessor ($750$) forming numerical lookup table of function $$\cos\left(\frac{2.76}{N-1}T\right), T = mt/\tau$$

in response to the Tx pulse duration τ through path ($759$), and synchronized by the reference clock signal. The dither block ($709$) also comprises a digital-to-analog converter with filter ($752$) synchronized by the reference clock, for converting numerical signal from lookup table block ($750$) into continuous signal cos(mΔft). The dither block further comprises a mixer ($754$) creating in-phase signals with dual frequencies ±mΔf of equal magnitude.

An electromagnetic transmitter arrangement comprises an antenna subarray ($901$). The subarray ($901$) comprises first ($912_{8,0}$), second ($912_{7,0}$), third ($912_{6,0}$), fourth ($912_{8,1}$), fifth ($912_{7,1}$), sixth ($912_{6,1}$), seventh ($912_{8,2}$), eighth ($912_{7,2}$), and ninth ($912_{6,2}$) antenna elements arranged in first (0), second (I), and third (II) rows orthogonally intersecting first (8), second (7), and third (6) columns, with the first antenna element ($912_{8,0}$) lying at the intersection of the first row (0) and the first column (8), the second antenna element ($912_{7,0}$) lying at the intersection of the first row (0) and the second column (7), the third antenna element ($912_{6,0}$) lying at the intersection of the first row (0) and the third column (6), the fourth antenna element ($912_{8,1}$) lying at the intersection of the second row (I) and the first column (8), the fifth antenna element ($912_{7,1}$) lying at the intersection of the second row (I) and the second column (7), the sixth antenna element ($912_{6,1}$) lying at the intersection of the second row (I) and the third column (6), the seventh antenna element ($912_{8,2}$) lying at the intersection of the third row (II) and the first column (8), the eighth antenna element ($912_{7,2}$) lying at the intersection of the third row (II) and the second column (7), and the ninth antenna element ($912_{6,2}$) lying at the intersection of the third row (II) and the third column (6). The electromagnetic transmitter arrangement comprises first ($916_{8,0}$), second ($916_{7,0}$), third ($916_{6,0}$), fourth ($916_{8,1}$), fifth ($916_{7,1}$), sixth ($916_{6,1}$), seventh ($916_{8,2}$), eighth ($916_{7,2}$), and ninth ($916_{6,2}$) radio-frequency signal sources, the first ($916_{8,0}$), second ($916_{7,0}$), third ($916_{6,0}$), fourth ($916_{8,1}$), fifth ($916_{7,1}$), sixth ($916_{6,1}$), seventh ($916_{8,2}$), eighth ($916_{7,2}$), and ninth ($916_{6,2}$) signal sources generating radio-frequency signals at frequencies f0±8Δf±f0& f0, f0±7Δf±f0& f0, f0±6Δf±f0& f0, f0±8Δf±δf, f0±7Δf±δf, f0±6Δf±δf, f0±8Δf±2δf, f0±7δf±2δf, f0±6Δf±2δf, respectively. First ($918_{8,0}$), second ($918_{7,0}$), third ($918_{6,0}$), fourth ($918_{8,1}$), fifth ($918_{7,1}$), sixth ($918_{6,1}$), seventh ($918_{8,2}$), eighth ($918_{7,2}$), and ninth ($918_{6,2}$) coupling elements interconnect the first ($912_{8,0}$), second ($912_{7,0}$), third ($912_{6,0}$), fourth ($912_{8,1}$), fifth ($912_{7,1}$), sixth ($912_{6,1}$), seventh ($912_{8,2}$), eighth ($912_{7,2}$), and ninth ($912_{6,2}$) antenna elements with the first ($916_{8,0}$), second ($916_{7,0}$), third ($916_{6,0}$), fourth ($916_{8,1}$), fifth ($916_{7,1}$), sixth ($916_{6,1}$), seventh ($916_{8,2}$), eighth ($916_{7,2}$), and ninth ($916_{6,2}$) radio-frequency signal sources, respectively. In a particular embodiment of the electromagnetic transmitter arrangement, the coupling elements include one of phase shifters and time delays.

An electromagnetic transmitter arrangement comprises an antenna subarray ($901$). The antenna subarray ($901$) comprises first ($912_{8,0}$), second ($912_{7,0}$), third ($912_{6,0}$), fourth ($912_{8,1}$), fifth ($912_{7,1}$), sixth ($912_{6,1}$), seventh ($912_{8,2}$), eighth ($912_{7,2}$), and ninth ($912_{6,2}$) antenna elements arranged in first (0), second (I), and third (II) rows orthogonally intersecting first (8), second (7), and third (6) columns, with the first antenna element ($912_{8,0}$) lying at the intersection of the first row (0) and the first column (8), the second antenna element ($912_{7,0}$) lying at the intersection of the first row (0) and the second column (7), the third antenna element ($912_{6,0}$) lying at the intersection of the first row (0) and the third column (6), the fourth antenna element ($912_{8,1}$) lying at the intersection of the second row (I) and the first column (8), the fifth antenna element ($912_{7,1}$) lying at the intersection of the second row (I) and the second column (7), the sixth antenna element ($912_{6,1}$) lying at the intersection of the second row (I) and the third column (6), the seventh antenna element ($912_{8,2}$) lying at the intersection of the third row (II) and the first column (8), the eighth antenna element ($912_{7,2}$) lying at the intersection of the third row (II) and the second column (7), and the ninth antenna element ($912_{6,2}$) lying at the intersection of the third row (II) and the third column (6). The electromagnetic transmitter arrangement further comprises first ($912_{8,0}$), second ($916_{8,0}$), third ($916_{8,0}$), fourth ($916_{8,0}$), fifth ($916_{8,0}$), sixth ($916_{8,0}$), seventh ($916_{8,0}$), eighth ($916_{8,0}$), and ninth ($916_{8,0}$) radio-frequency signal sources, the first ($916_{8,0}$), second ($916_{8,0}$), third ($916_{8,0}$), fourth ($916_{8,0}$), fifth ($916_{8,0}$), sixth ($916_{8,0}$), seventh ($916_{8,0}$), eighth ($916_{8,0}$), and ninth ($916_{8,0}$) signal sources generating radio-frequency signals at a carrier frequency, where the carrier frequency changes from element to element to define a first bidirectional frequency gradient in the column direction of the array and to define a second bidirectional frequency gradient in the row directions of the array. In a particular embodiment of the electromagnetic transmitter arrangement, the first and second bidirectional frequency gradients are mutually different. The first bidirectional frequency gradient may be a stepwise frequency gradient $\Delta f$ and the second bidirectional frequency gradient may be a stepwise frequency gradient $\delta f$.

An electromagnetic transmitter arrangement (600) comprises one of an antenna line array (612) and subarray (613). The one of the line array (612) and subarray (613) defines at least first (left) and second (right) ends. The one of the line array (612) and subarray (613) includes at least first ($612_0$), second ($612_1$), third ($612_2$), fourth ($612_3$), and fifth ($612_4$) antenna elements, with the first antenna element ($612_0$) at the first (left) end of the one of the line array (612) and subarray (613), the fifth antenna element ($612_4$) at the second (right) end of the one of the line array (612) and subarray (613), the third antenna element ($612_2$) at the center of the one of the line array (612) and subarray (613), the second antenna element ($612_1$) lying between the first ($612_0$) and third ($612_2$) antenna elements, and the fourth antenna element ($612_3$) lying between the third ($612_2$) and fifth ($612_4$) antenna elements. The electromagnetic transmitter arrangement (600) also comprises first ($616_0$), second ($616_1$), third ($616_2$), fourth ($616_3$), and fifth ($616_4$) radio-frequency signal sources, the first signal source ($616_0$) generating signals at frequency of (f0), the second signal source ($616_1$) generating frequencies of (f0) $\pm\Delta f$, where the symbol $\pm$ means "plus and minus," the third signal source ($616_2$) generating frequencies of (f0)$\pm 2\Delta f$, the fourth signal source ($616_3$) generating frequencies of (f0) $\pm 3\Delta f$, and the fifth signal source ($616_4$) generating frequencies of (f0)$\pm 4\Delta f$. The signals at frequency of (f0) may be generated by two in-phase sources. A first radio-frequency signal path (618a) extends from the first signal source ($616_0$) to the first antenna element ($612_0$), a second radio-frequency signal path (618b) extends from the second signal source ($616_1$) to the second antenna element ($612_1$), a third radio-frequency signal path (618c) extends from the third signal source ($616_2$) to the third antenna element ($612_2$), a fourth radio-frequency signal path (618d) extends from the fourth signal source ($616_3$) to the fourth antenna element ($612_3$), and a fifth radio-frequency signal path (618e) extends from the fifth signal source ($616_4$) to the fifth antenna element ($612_4$). The one of an antenna line array (612) and subarray (613) may be part of a planar array (900). Each of the first (618a), second (618b), third (618c), fourth (618d), and fifth (618e) radio-frequency signal paths in one version includes one of a phase shifter ($607_1$ etc) and a time-delay element. Each of the first (618a), second (618b), third (618c), fourth (618d), and fifth (618e) radio-frequency signal paths in another version includes at least one of a phase shifter (707), an amplifier (762), and a circulator (705). The first ($616_0$), second ($616_1$), third ($616_2$), fourth ($616_3$), and fifth ($616_4$) radio-frequency signal sources may transmit their respective signals in a synchronized manner (by 761).

What is claimed is:

1. An electromagnetic transmitter arrangement, comprising:

one of an antenna line array and subarray, said one of said line array and subarray defining at least first and second ends, said one of said line array and subarray including at least first, second, third, fourth, and fifth antenna elements, with said first antenna element at said first end of said one of said line array and subarray, said fifth antenna element at said second end of said one of said line array and subarray, said third antenna element at the center of said one of said line array and subarray, said second antenna element lying between said first and third antenna elements, and said fourth antenna element lying between said third and fifth antenna elements;

first, second, third, fourth, and fifth radio-frequency signal sources each signal source including a dither block to generate signals with a frequency offset that progressively increases at each of said first, second, third, fourth and fifth antenna elements, such that said first signal source generates signals at frequency of f0, said second signal source generates frequencies of f0$\pm\Delta f$, where the symbol $\pm$ means "plus and minus," said third signal source generates frequencies of f0$\pm 2\Delta f$, said fourth signal source generates frequencies of f0$\pm 3\Delta f$, and said fifth signal source generates frequencies of f0$\pm 4\Delta f$; and a first radio-frequency signal path extending from said first signal source to said first antenna element, a second radio-frequency signal path extending from said second signal source to said second antenna element, a third radio-frequency signal path extending from said third signal source to said third antenna element, a fourth radio-frequency signal path extending from said fourth signal source to said fourth antenna element, and a fifth radio-frequency signal path extending from said fifth signal source to said fifth antenna element, wherein each of said first, second, third, fourth and fifth radio-frequency signal paths includes a controllable switch, each said controllable switch connected in parallel with a corresponding one of said first, second, third, fourth and fifth dither blocks, each said controllable switch configured to bypass the corresponding dither block when the controllable switch is closed.

2. An electromagnetic transmitter arrangement according to claim 1, wherein said one of an antenna line array and subarray is an antenna line array.

3. An electromagnetic transmitter arrangement according to claim 1, wherein said one of an antenna line array and subarray is part of a planar array.

4. An electromagnetic transmitter arrangement according to claim 1, wherein each of said first, second, third, fourth, and fifth radio-frequency signal paths includes one of a phase shifter and a time-delay element.

5. An electromagnetic transmitter arrangement according to claim 1, wherein each of said first, second, third, fourth, and fifth radio-frequency signal paths includes at least one of a phase shifter, an amplifier, and a circulator.

6. An electromagnetic transmitter arrangement according to claim 1, wherein said first, second, third, fourth, and fifth radio-frequency signal sources transmit their respective signals in a synchronized manner.

7. An electromagnetic transmitter arrangement, comprising:
- an antenna subarray, comprising first, second, third, fourth, fifth, sixth, seventh, eighth, and ninth antenna elements arranged in first, second, and third rows orthogonally intersecting first, second, and third columns, with said first antenna element lying at the intersection of said first row and said first column, said second antenna element lying at the intersection of said first row and said second column, said third antenna element lying at the intersection of said first row and said third column, said fourth antenna element lying at the intersection of said second row and said first column, said fifth antenna element lying at the intersection of said second row and said second column, said sixth antenna element lying at the intersection of said second row and said third column, said seventh antenna element lying at the intersection of said third row and said first column, said eighth antenna element lying at the intersection of said third row and said second column, and said ninth antenna element lying at the intersection of said third row and said third column;
- first, second, third, fourth, fifth, sixth, seventh, eighth, and ninth radio-frequency signal sources, said first, second, third, fourth, fifth, sixth, seventh, eighth, and ninth signal sources generating radio-frequency signals at frequencies $f0\pm8\Delta f+f0$ at double amplitude, $f0\pm7\Delta f+f0$ at double amplitude, $f0\pm6\Delta f+f0$ at double amplitude, $f0\pm8\Delta f\pm\delta f$, $f0\pm7\Delta f\pm\delta f$, $f0\pm6\Delta f\pm\delta f$, $f0\pm8\Delta f\pm2\delta f$, $f0\pm7\Delta f\pm2\delta f$, $f0\pm6\Delta f\pm2\delta f$, respectively; and
- first, second, third, fourth, fifth, sixth, seventh, eighth, and ninth coupling elements interconnecting said first, second, third, fourth, fifth, sixth, seventh, eighth, and ninth antenna elements with said first, second, third, fourth, fifth, sixth, seventh, eighth, and ninth radio-frequency signal sources, respectively.

8. An electromagnetic transmitter arrangement according to claim 7, wherein said antenna subarray is part of a planar array.

9. An electromagnetic transmitter arrangement according to claim 7, wherein said coupling elements include one of a phase shifter element and a time delay element.

10. An electromagnetic transmitter arrangement according to claim 7, wherein each of said first, second, third, fourth, fifth, sixth, seventh, eighth, and ninth coupling elements includes at least one of a phase shifter, an amplifier, and a circulator.

11. An electromagnetic transmitter arrangement according to claim 7, wherein said first, second, third, fourth, fifth, sixth, seventh, eighth, and ninth radio-frequency signal sources transmit their respective signals in a synchronized manner.

12. An electromagnetic transmitter arrangement comprising:
- an antenna subarray, comprising first, second, third, fourth, fifth, sixth, seventh, eighth, and ninth antenna elements arranged in first, second, and third rows orthogonally intersecting first, second, and third columns, with said first antenna element lying at the intersection of said first row and said first column, said second antenna element lying at the intersection of said first row and said second column, said third antenna element lying at the intersection of said first row and said third column, said fourth antenna element lying at the intersection of said second row and said first column, said fifth antenna element lying at the intersection of said second row and said second column, said sixth antenna element lying at the intersection of said second row and said third column, said seventh antenna element lying at the intersection of said third row and said first column, said eighth antenna element lying at the intersection of said third row and said second column, and said ninth antenna element lying at the intersection of said third row and said third column;
- first, second, third, fourth, fifth, sixth, seventh, eighth, and ninth radio-frequency signal sources, said first, second, third, fourth, fifth, sixth, seventh, eighth, and ninth signal sources generating radio-frequency signals at a carrier frequency, where said carrier frequency changes from element to element to define a first bidirectional frequency gradient in the column direction of said array and to define a second bidirectional frequency gradient in the row directions of said array.

13. An electromagnetic transmitter arrangement according to claim 12, wherein said first and second bidirectional frequency gradients are mutually different.

14. An electromagnetic transmitter arrangement according to claim 12, wherein said first bidirectional frequency gradient is a stepwise frequency gradient $\Delta f$ and said second bidirectional frequency gradient is a stepwise bidirectional frequency gradient $\delta f$.

15. An electromagnetic transmitter arrangement according to claim 12, further comprising first, second, third, fourth, fifth, sixth, seventh, eighth, and ninth signal paths interconnecting said first, second, third, fourth, fifth, sixth, seventh, eighth, and ninth antenna elements with said first, second, third, fourth, fifth, sixth, seventh, eighth, and ninth radio-frequency signal sources, respectively.

16. An electromagnetic transmitter arrangement according to claim 15, wherein each of said first, second, third, fourth, fifth, sixth, seventh, eighth, and ninth signal paths includes at least one of a phase shifter, a time delay element, an amplifier, and a circulator.

17. An electromagnetic transmitter arrangement comprising:
- one of an antenna line array and subarray, said one of said line array and subarray defining at least first and second ends, said one of said line array and subarray including at least first, second, third, fourth, and fifth antenna elements, with said first antenna element at said first end of said one of said line array and subarray, said fifth antenna element at said second end of said one of said line array and subarray, said third antenna element at the center of said one of said line array and subarray, said second antenna element lying between said first and third antenna elements, and said fourth antenna element lying between said third and fifth antenna elements;
- first, second, third, fourth, and fifth radio-frequency signal sources, said first signal source generating signals at frequency of f0, said second signal source generating frequencies of $f0\pm\Delta f$, where the symbol $\pm$ means "plus and minus," said third signal source generating frequencies of $f0\pm2\Delta f$, said fourth signal source generating frequencies of $f0\pm3\Delta f$, and said fifth signal source generating frequencies of $f0\pm4\Delta f$, wherein signal sources having a positive frequency offset generate a counter-clockwise rotating beam, and signal sources having a negative frequency offset generate a clockwise rotating beam; and
- a first radio-frequency signal path extending from said first signal source to said first antenna element, a second radio-frequency signal path extending from said second signal source to said second antenna element, a third radio-frequency signal path extending from said third signal source to said third antenna element, a fourth radio-frequency signal path extending from said fourth signal source to said fourth antenna element, and a fifth radio-frequency signal path extending from said fifth signal source to said fifth antenna element.

18. An electromagnetic transmitter arrangement according to claim 17, wherein said one of an antenna line array and subarray is part of a planar array.

19. An electromagnetic transmitter arrangement according to claim 17, wherein each of said first, second, third, fourth, and fifth radio-frequency signal paths includes one of a phase shifter and a time-delay element.

20. An electromagnetic transmitter arrangement according to claim 17, wherein said first, second, third, fourth, and fifth radio-frequency signal sources transmit their respective signals in a synchronized manner.

* * * * *